(12) United States Patent
Kwiatkowski

(10) Patent No.: US 12,541,494 B2
(45) Date of Patent: Feb. 3, 2026

(54) SCALABLE COLLECTIONS WITHIN A BALANCED CHUNKED TREE DATA STRUCTURE

(71) Applicant: Microsoft Technology Licensing, LLC, Redmond, WA (US)

(72) Inventor: Paul Jerome Kwiatkowski, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 18/664,548

(22) Filed: May 15, 2024

(65) Prior Publication Data
US 2025/0355851 A1 Nov. 20, 2025

(51) Int. Cl.
*G06F 16/22* (2019.01)
*G06F 16/27* (2019.01)

(52) U.S. Cl.
CPC .......... *G06F 16/2246* (2019.01); *G06F 16/27* (2019.01)

(58) Field of Classification Search
CPC .... G06F 16/2246; G06F 16/27; G06F 16/273; G06F 16/275; G06F 16/278
USPC ........................................................ 707/797
See application file for complete search history.

(56) References Cited

U.S. PATENT DOCUMENTS

| | | |
|---|---|---|
| 6,212,534 B1 | 4/2001 | Lo et al. |
| 11,030,187 B1 * | 6/2021 | Boodman ............. G06F 16/235 |
| 2011/0035376 A1 | 2/2011 | Kirshenbaum |
| 2019/0102370 A1 * | 4/2019 | Nelson .................. G06F 40/143 |
| 2020/0053176 A1 * | 2/2020 | Jimenez Salgado .... G06F 9/543 |
| 2021/0081605 A1 * | 3/2021 | Smith ...................... G06F 16/93 |
| 2025/0165533 A1 | 5/2025 | Kwiatkowski |

OTHER PUBLICATIONS

Non-final office action mailed on Mar. 5, 2025, in U.S. Appl. No. 18/513, 129, 21 Pages.
"Microsoft / FluidFramework", Retrieved from: https://github.com/microsoft/FluidFramework, Sep. 27, 2023, 1 Page.
"Persistent data structure", Retrieved from: https://en.wikipedia.org/wiki/Persistent_data_structure, Sep. 1, 2023, 15 Pages.
Non-final office action mailed on Aug. 18, 2025, in U.S. Appl. No. 18/513,129, 17 Pages.
International Search Report and Written Opinion received for PCT Application No. PCT/US2025/017091, mailed on Jul. 1, 2025, 15 pages.
Leibenger et al., "sec-cs: Getting The Most Out of Untrusted Cloud Storage", 42nd Conference on Local Computer Networks, IEEE, Oct. 2017, pp. 623-631.

* cited by examiner

Primary Examiner — Michael Pham

(57) ABSTRACT

Systems and methods for using a scalable collection within a balanced tree data structure are provided herein. In particular, techniques for generating scalable collections and using scalable collections for fetching data corresponding to an application using balanced chunked data tree structures are provided herein. In an example, the method may include determining a document defined by a balanced tree data structure having a root chunk, reference chunks, and chunks each having nodes each corresponding to a document attribute. The nodes may include a scalable collection containing a list node and child nodes associated with the list node, and a placeholder node that provides a reference to another chunk based on a position of the placeholder node within a respective chunk. The method may also include navigating to content within the document based on the balanced tree data structure.

20 Claims, 15 Drawing Sheets

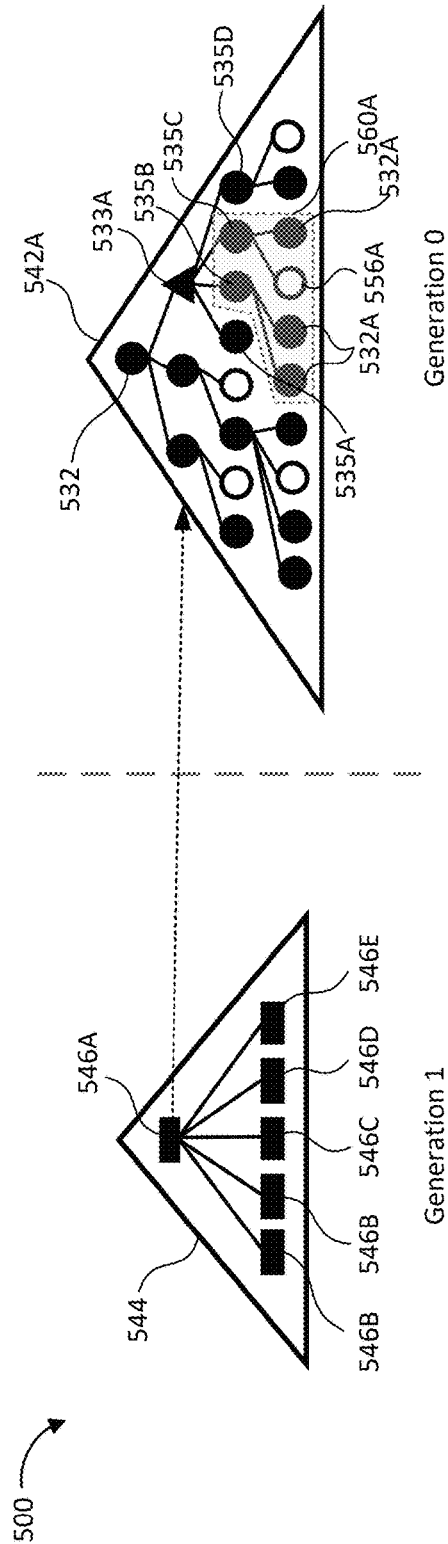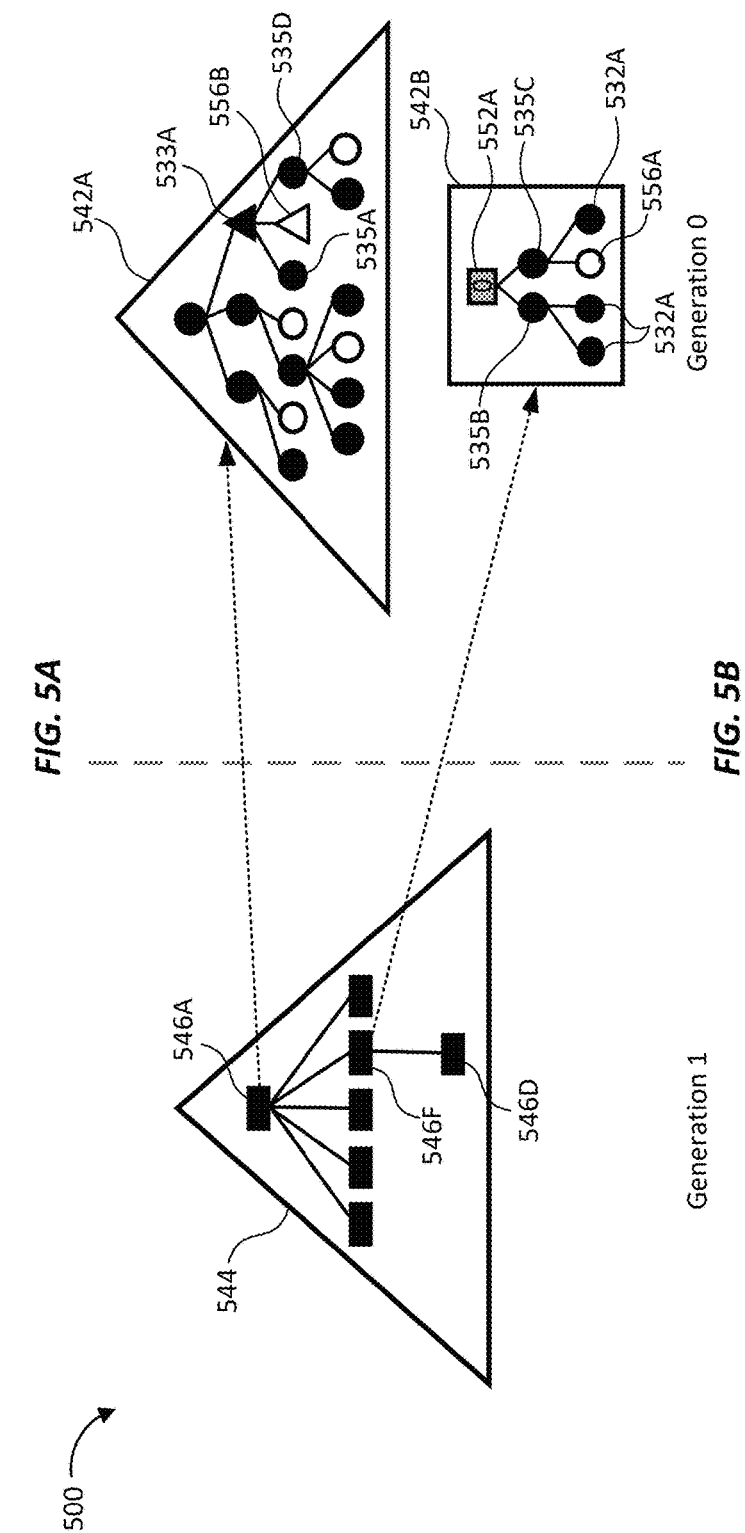
FIG. 5A
FIG. 5B

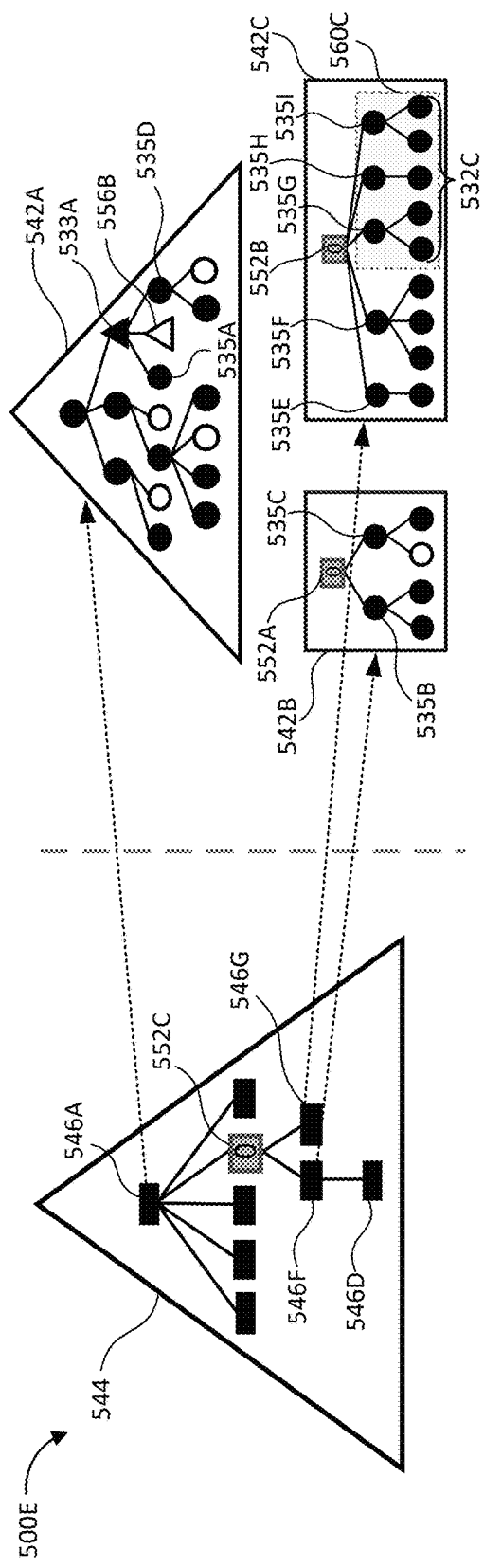
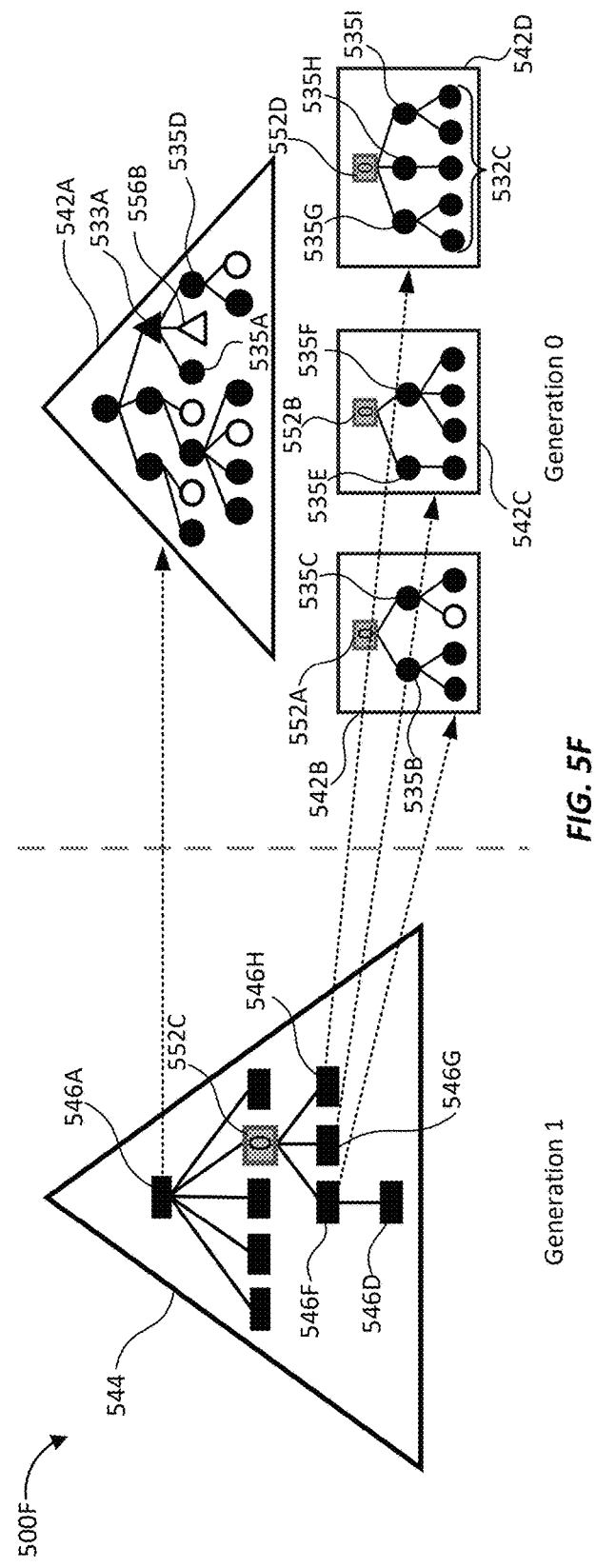
FIG. 5E
FIG. 5F

SCALABLE COLLECTIONS WITHIN A BALANCED CHUNKED TREE DATA STRUCTURE

TECHNICAL FIELD

Examples of the disclosure are related to the field of computer software applications and services and, in particular, to data structures for software applications.

BACKGROUND

As businesses have spread across geographically distant locations, and/or moved to a hybrid work environment, collaboration applications and experiences are increasingly relied upon. A collaboration application is a software tool designed to facilitate real-time, interactive teamwork among users, regardless of their physical locations. These applications often incorporate features such as document sharing, simultaneous editing, and communication tools to enable seamless cooperation on projects, whether in the workplace or during remote collaborations. Collaboration applications have become increasingly essential in today's professional and private environments, fostering improved productivity and communication between users.

A limitation of collaboration applications, however, is the data structure utilized to create and store content as it is generated and revised within a collaborative document. Current data structures require at least one client that is accessing the document to upload and download an entire version of the document. That is, current data structuring techniques require entire versions of each distributed data structure for a given document to be downloaded in their entirety by accessing clients. Requiring that entire versions of the data structure for a collaborative document be downloaded (or uploaded) periodically when the document is edited, revised, or even accessed, has high storage and bandwidth costs, and high latency requirements for users within collaboration sessions.

While some current data structuring techniques, such as B-tree data structures break down data into sub-categories, such as "branches" and "leaves", B-trees still require sub-categories of data to be downloaded in their entirety for an application to navigate to a given data endpoint. That is, to navigate between "leaves" on the B-tree, the application must load the respective branch and surrounding leaves. Moreover, B-trees require data to be represented in a linear fashion. Similarly, while "binary blobs," such as bitmaps are uploaded and downloaded separately, the underlying data structures themselves have no incrementality and thus do not scale well. These issues are often pronounced when data structures accommodate data corresponding to lists.

Accordingly, there is a need for improved data structuring techniques for collaboration applications. Specifically, there is a need for improved data structuring techniques that reduce processor and storage requirements of accessing clients, as well as reduce latency and bandwidth requirements for clients joining collaboration sessions.

SUMMARY

Technology disclosed herein includes software applications and services that provide scalable collections within a balanced chunked tree data structure. An example of a balanced chunked tree data structure includes Spatially Partitioned Ideally Chunked Entity ("SPICE") tree data structures, such as the data structures described in patent application Ser. No. 18/513,129, titled "SPATIALLY PARTITIONED IDEALLY CHUNKED ENTITY TREE." As will be described in greater detail below, the scalable collections illustrated herein provide for efficient management and organization of data having varying size and shape.

In particular, the following discussion provides techniques for generating scalable collections and using scalable collections for fetching data corresponding to an application using balanced chunked data tree structures. In particular, techniques focus on generating and using scalable collections to fetch and accommodate list content as it is generated and modified within the corresponding application. The scalable collections provided herein address processing, memory, latency, and bandwidth considerations present in current data structures and related techniques for accommodating list content.

In an example, the techniques provided herein provide a technique for using scalable collections within a balanced tree data structure. For example, a document may be defined by a balanced tree data structure (e.g., SPICE tree data structure) having a root chunk, a plurality of reference chunks, and a plurality of chunks. Each of the chunks may include one or more nodes each corresponding to a document attribute. The one or more nodes may also include a scalable collection that includes a list node and child nodes associated with the list node. The nodes may also include a placeholder node that provides a reference to another chunk within the chunks based on a position of the placeholder node within a respective chunk.

The root chunk, the reference chunks, and the chunks may be arranged in a hierarchical arrangement with the root chunk being a parent to one or more reference chunks and the reference chunks being a parent to one or more chunks. Each level of the hierarchical arrangement may define a generation level. The techniques provided herein include navigating content within the document based on the balanced tree data structure, such as navigating the content by determining a modification is made to list content within the document and determining that the list content corresponds to the scalable collection within a first chunk. In such cases, the techniques involve modifying the child nodes, which are siblings to each other within a first generation level, within the scalable collection based on the modification to the list content.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many Examples of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 5A-F illustrate an example environment in which a scalable collection within a balanced chunked tree data structure is created and implemented, according to an embodiment herein;

DETAILED DESCRIPTION

Figure 1:
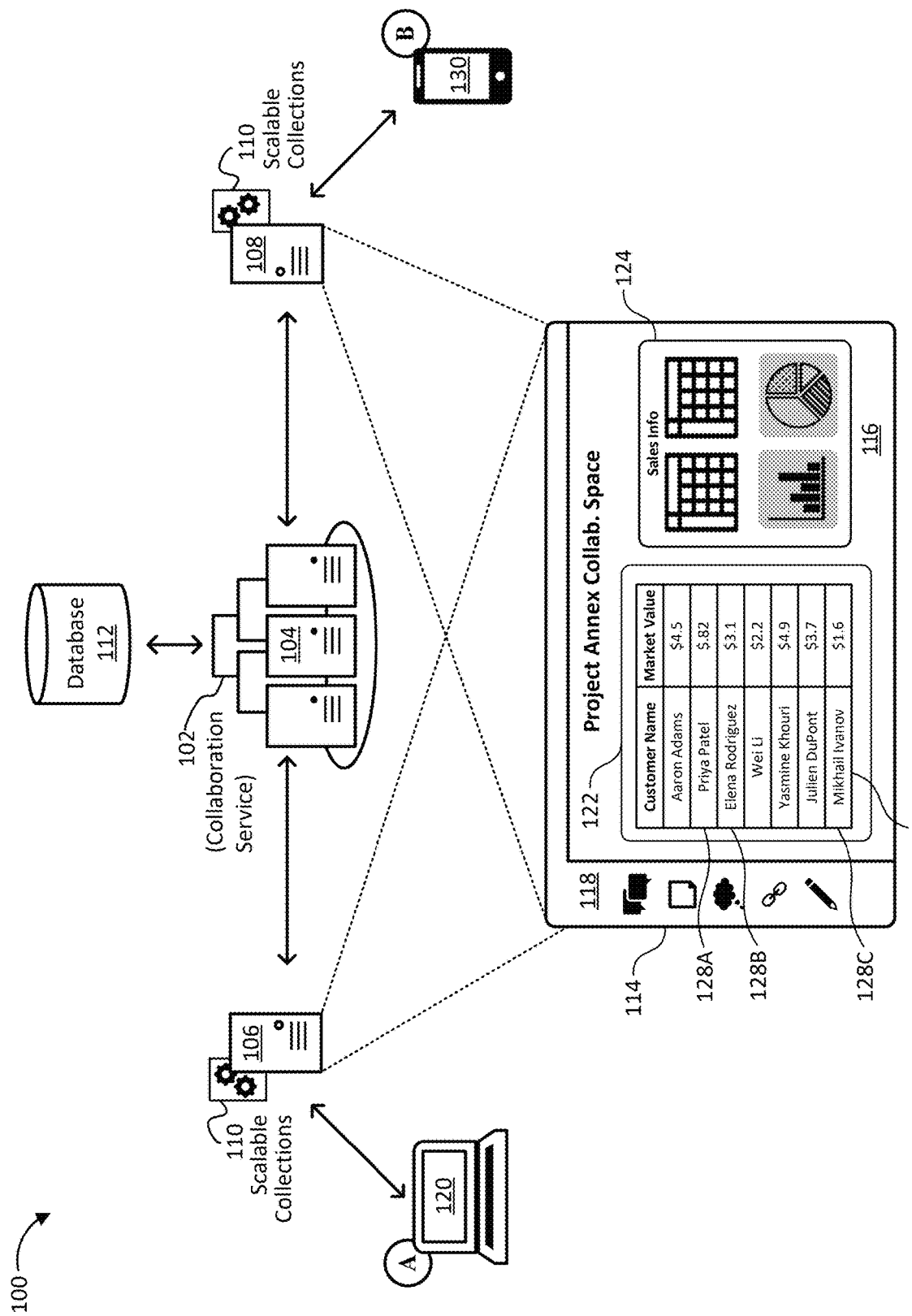
FIG. 1 illustrates an operational environment for providing one or more scalable collections within a balanced chunked tree data tree, according to an embodiment herein.

In the contemporary era, applications, particularly collaboration tools, are increasingly relied upon both within professional and personal realms. Within professional domains, these applications have evolved into essential instruments that underpin modern teamwork. They facilitate seamless communication and coordination across diverse and geographically dispersed teams, optimizing project management, document sharing, and real-time collaboration. Such tools contribute to heightened productivity and streamlined workflows, fostering efficient and dynamic work environments. Moreover, beyond professional contexts, collaboration applications seamlessly integrate into individuals' personal spheres, reshaping the way they connect with friends and family. Virtual gatherings, shared documents, and collaborative albums exemplify the multifaceted role these applications play in daily life. As technological advancements persist, the reliance on such applications is poised to deepen further, reshaping the landscape of both professional and personal interactions.

Current collaboration applications, however, face a myriad of challenges, with two prominent issues being increased processing requirements and latency. As these applications strive to accommodate a growing array of features and functionalities, the demand for higher processing power has surged. This heightened processing requirement can strain both the user's device and the application's servers, leading to slower response times and decreased overall performance. Additionally, latency, or the delay between user input and system response, has become a persistent concern. The real-time nature of collaboration tools demands swift interactions, and any delay can hinder the seamless flow of communication and collaboration. These challenges are exacerbated as users engage in resource-intensive tasks such as file sharing and simultaneous editing. It should be appreciated that while these issues are increasingly highlighted for collaboration applications, non-collaboration applications may also be challenged by processing and latency limitations. As such, the systems and techniques provided herein are equally applicable to collaboration and non-collaboration applications.

Underlying data structures play a pivotal role in exacerbating issues related to high processing requirements and latency. The intricate nature of collaboration tools often involves the manipulation and synchronization of large datasets, leading to increased processing demands. As these applications handle numerous concurrent users engaged in real-time interactions, the strain on data structures intensifies. The need for efficient storage, retrieval, and update of information within these structures amplifies processing requirements, contributing to delays and decreased system responsiveness. Moreover, the intricacies of maintaining consistency across distributed datasets, particularly in collaborative editing scenarios, introduce latency as the application grapples with syncing changes across diverse user interfaces.

An illustrative example of the challenges posed by data structures is exemplified by current balanced tree ("B-tree") data structures which structure data corresponding to an underlying application such that each "leaf" of the tree corresponds to a specific piece of data or element. Leaves of the tree are attached to branches that connect to a trunk and root of the B-tree. In a scenario where multiple users are simultaneously editing different sections of a shared document, the balanced tree data structure is employed to organize and manage the content efficiently. However, when a user attempts to access or modify a specific leaf node—representing a small section of the document—the entire branch leading to that leaf, including other non-relevant leaves on the same branch, must be loaded into memory. This process becomes increasingly resource-intensive as the document grows in size or complexity, requiring the application to fetch and process a substantial amount of data even for minor edits. As a result, the processing requirements escalate, leading to delays in rendering the changes and impacting the responsiveness of the application. The need to load entire branches for accessing specific leaves highlights the inefficiency of current data structures, contributing significantly to both high processing demands and latency issues within the collaborative editing environment.

The inefficiencies arising from loading entire portions of a data structure become even more pronounced when dealing with specific elements within lists or ranges. For instance, in collaborative applications managing a shared list where each node corresponds to a specific value or range of values, the need to load entire branches to access individual list elements presents a significant bottleneck. When a user seeks to modify or retrieve information associated with a particular value, the application is compelled to load the entire branch, encompassing potentially unrelated elements, into memory. As can be appreciated, lists may include any number of values, ranging from a few to a few million, thus loading the entire list into memory not only intensifies processing requirements but also introduces unnecessary delays. The rigid nature of loading entire branches for individual list elements underscores the limitations of the current data structures, hindering the seamless and responsive interaction essential for collaborative environments.

Another challenge faced by current data structures involves serving as efficient persistent data structures. A persistent data structure is one that allows the preservation of previous versions even after modifications or updates, ensuring the ability to access historical states of the data. The challenge arises from the inherent design of conventional structures, like arrays or linked lists, which prioritize real-time performance at the expense of versioning capabilities. When attempting to implement persistence in these structures, the process typically involves creating entirely new copies of the entire structure for each modification, leading to increased memory usage and potential inefficiencies. The complexities of maintaining both current and historical versions strain system resources and hinder the responsiveness of applications relying on persistent data structures. As the demand for comprehensive versioning and historical tracking becomes more prevalent in collaborative and dynamic environments, the limitations of traditional data structures in providing efficient persistence underscore the need for innovative approaches that balance real-time performance with historical data preservation.

To address the above shortcomings of conventional data structures, scalable collections within balanced chunked tree data structures are provided herein. As will be described below, the scalable collections provided herein allow for targeted access to specific list elements, eliminating the cumbersome practice of loading unrelated data. The scalable collections function to seamlessly accommodate the dynamic and real-time nature of collaborative work, striking a delicate balance between accommodating real-time interactions while minimizing processing and latency burdens on underlying clients. Moreover, the scalable collections facilitate persistent data structures by allowing target access and duplication of only edited content without requiring copies of entire data structures to be made for every revision to an underlying application.

The ability of scalable collections to address the shortcomings of conventional data structures is due, in part, to the framework of the scalable collections. The framework, which will be described in greater detail below, allows scalable collections to efficiently accommodate data of varying sizes and shapes within a balanced tree data structure. The balanced nature of trees, such as SPICE trees, AVL (Adelson-Velsky and Landis) trees or Red-Black trees, ensures logarithmic height, resulting in O(log n) time complexity for search and retrieval operations. This scalability is vital for managing large datasets or dynamic applications, as the structure can efficiently handle a diverse range of elements.

Additionally, the dynamic insertion and deletion capabilities of scalable collections within balanced trees enable the structure to adapt to changes in data size and shape while maintaining balance. Scalable collections represent data in a minimally "tree-like" fashion, such that a target data or element can be quickly and efficiently accessed in a minimal amount of depth into the data structure. Moreover, the scalable collections may include a collection aggregator that provides information to support efficient access patterns. For example, a collection aggregator may include nonlocal information, such as a sublist or submap (e.g., a total number of data elements in the respective list before the element of interest) that allows for an offset of a target element to be computed. In particular, the collection aggregator allows the offset of a target element to be computed or dereferenced in O(log n) time. As those skilled in the art readily appreciate, achieving O(log n) time for accessing a target element within a data structure is crucial for efficient searching, scalability with large datasets, and optimal performance in real-time applications. This logarithmic growth rate ensures predictable and manageable access times, particularly in sorted and balanced structures, making it a key consideration for various practical applications.

Furthermore, the use of scalable collections within balanced trees allows for the creation of persistent data structures. These structures retain previous versions of the data, facilitating historical queries and ensuring that the system maintains a consistent and organized state over time. The versatility of balanced trees, coupled with the ability of scalable collections to handle data of any size and shape, makes them an ideal choice for applications where persistent and scalable data management is paramount. As scalable collections provide targeted access and revision of content, scalable collections allow for copies of only edited content to be made to maintain a persistent data structure, instead of requiring a copy of an entire data structure, as is currently required.

Accordingly, the scalable collections within balanced chunked tree data structures provides an efficient and improved approach to supporting collaboration applications having diverse ranges of data shape and sizes and creation of persistent data structures. Whether it's accommodating dynamic datasets or supporting historical queries, the scalable collections within balanced chunked tree structures provided herein deliver a robust foundation for addressing the intricacies of diverse and evolving data scenarios within the ever-changing modern landscape.

Turning now to FIG. 1, FIG. 1 illustrates an operational environment 100 for providing one or more scalable collections 110 within a balanced chunked tree data tree, according to an embodiment herein. In particular, the operational environment 100 illustrates providing one or more scalable collections 110 during a collaboration session. As illustrated, the operational environment 100 includes a collaboration service 102 providing a first instance 106 of a document and a second instance 108 of the document. The first instance 106 and the second instance 108 of the document are for the same document, hosted by the collaboration service 102. As will be described in greater detail below, the first instance 106 is provided to a user A via a client device 120 and the second instance 108 is provided to a user B via a client device 130.

Figure 10:
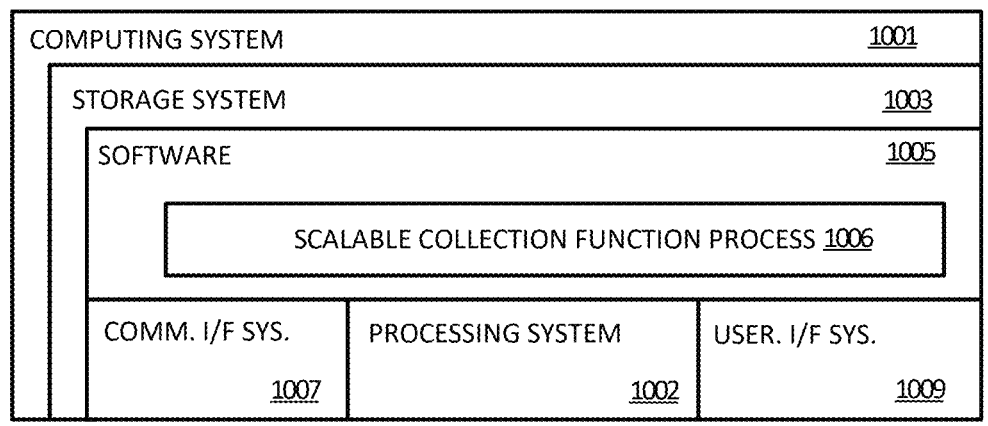
FIG. 10 shows an example client device suitable for providing one or more scalable collections, according to an embodiment herein.

As shown, the collaboration service 102 employs one or more server computers 104 co-located with respect to each other or distributed across one or more data centers. Example servers include web servers, application servers, virtual or physical servers, or any combination or variation thereof, of which computing system 1001 in FIG. 10 is broadly representative. The client devices 120 and 130 communicate with the collaboration service 102 via one or more internets and intranets, the Internet, wired and wireless networks, local area networks (LANs), wide area networks (WANs), or any other type of network or combination thereof. Examples of the client devices 120 and 130 may include personal computers, tablet computers, mobile phones, gaming consoles, wearable devices, Internet of Things (IoT) devices, and any other suitable devices, of which computing system 1001 in FIG. 10 is also broadly representative.

Broadly speaking, the collaboration service 102 provides software application services to end points, such as the client devices 120 and 130, examples of which include collaborative productivity software for creating content (e.g., whiteboards, word processing, spreadsheets, and presentations). The client devices 120 and 130 may load and execute software applications locally that interface with services and resources provided by the collaboration service 102. The applications may be natively installed and executed applications, web-based applications that execute in the context of a local browser application, mobile applications, streaming applications, or any other suitable type of application. Example services and resources provided by the collaboration service 102 include front-end servers, application servers, content storage services, authorization and authentication services, and the like.

In the illustrated example, a user A may access a first instance 106 of a document provided by the collaboration service 102 via the client device 120. In this scenario, the first instance 106 of the document may be natively installed and executed on the client device 120. Simultaneously, the user B may access the second instance 108 of the document provided by the collaboration service 102 via the client device 130. The second instance 108 of the document is a browser-based application that the user B accesses via a mobile application on the client device 130. Those skilled in the art will readily appreciate the various methodologies in which the first and second instances 106 and 108 of the collaboration application are accessed using the client devices 120 and 130, respectively.

The collaboration application provided by the first instance 106 and the collaboration application provided by the second instance 108 are the same collaboration application. For ease of explanation, the following discussion will involve the collaboration application being a whiteboard application, however, those skilled in the art will appreciate that any other type of software application may be equally applicable. Moreover, as noted above, while the following discussion focuses on collaboration applications accessed by more than one client device, non-collaborative applications are also envisaged. For example, scenarios in which the client device 120 accesses a productivity application (e.g., a word processing document) are equally applicable to the following description.

The collaboration application, provided by the collaboration service 102, is a digital platform that facilitates seamless communication and cooperation among individuals or teams, enabling them to work together on projects, share resources, and exchange information in a centralized and efficient manner. Here, the collaboration application, provided by the collaboration service 102 allows the user A and the user B to work together on a whiteboard 114. As such, the user A accesses the whiteboard 114 via the first instance 106 of the document and the user B accesses the whiteboard 114 via the second instance 108 of the document.

When accessing the whiteboard 114, the user A and the user B can make modifications or edits to content 116 of the whiteboard 114. For example, the whiteboard 114 may include elements 118 that allow for content 116 to be added, removed, or edited within the whiteboard 114. As illustrated, the content 116 of the whiteboard 114 may include components 122 and 124. As can be appreciated, the components 122 and 124 may be or include content 116 in a variety of formats, such as text, numbers, formulas, tables, ink, pictures, key/value maps, sets, links, audio, video, 3D models, and so forth. For example, the component 122 may include list content 126 containing numerous list elements, such as list elements 128A and 128B. Although the list content 126 is illustrated as having a limited number of list elements, it can be appreciated that in real world applications the list content 126 may contain hundreds, thousands, millions, or even billions of list elements.

Since the whiteboard 114 is a collaboration application, any modifications made by the user A and the user B will be made across both the first instance 106 and the second instance 108. That is, if the user A, via the client device 120, adds additional elements to the list content 126 within the first instance 106 of the document, then the additional elements will be present in the list content 126 provided by the component 122 within the second instance 108 of the document and viewable to the user B on the client device 130.

During conventional collaboration sessions using standard data structures and related techniques, one or both of the client devices 120 and the 130 is required to download a "snapshot" of the entire document from the collaboration service 102. That is, during a collaboration session, the majority, if not all, of the data for the whiteboard 114 is downloaded from a database 112 via the collaboration service 102 onto either the client device 120 and/or the client device 130. Although the database 112 is illustrated as separate from the collaboration service 102, in some embodiments, it may be part of the collaboration service 102, hosted by the same party that hosts the collaboration service 102, or hosted by a third party that is separate from the collaboration service 102.

As those skilled in the art will readily appreciate, the database 112 stores and maintains the data (e.g., files) corresponding to the content of the whiteboard 114. When the whiteboard 114 is accessed during a collaboration session, such as via the first instance 106 or the second instance 108 of the document, the collaboration service 102 follows a protocol to fetch the data associated with the whiteboard 114. The protocol to fetch the data associated with the whiteboard 114 follows logic that includes the structure of the data, also known as the data structure. That is, the data structure for the whiteboard 114 refers to the organization and storage of data within the database 112 in a way that allows for access, retrieval, and manipulation by the collaboration application.

As noted above, current data structures and techniques require that a "snapshot" of the entire whiteboard 114 be downloaded by one or both of the client devices 120 and 130 during a collaboration session. By downloading the data corresponding to the whiteboard 114, the client devices 120 and 130 can navigate through the content 116 of the whiteboard 114 without latency issues. Additionally, as modifications/edits are made to the content 116 of the whiteboard 114, those changes are made to the "snapshot" that is saved locally on one or both client devices 120 and 130. The modified "snapshot" are periodically uploaded to the collaboration service 102 and stored in the database 112. In this manner, when the whiteboard 114 is accessed at a later date, the modifications made to the whiteboard 114 during the collaboration session with the user A and the user B are present.

As can be appreciated, however, requiring one or both of the client devices 120 and 130 to download the entirety or a large portion of the data corresponding to the whiteboard 114 has processor and storage implications. That is, if the client device 120 is downloading and storing the "snapshot" of the whiteboard 114, the client device 120 must have enough memory for the download. For example, if the client device 120 is making a minor edit to the list content 126, such as adding or revision a single list element, current data structures may require that the entirety of the list content 126 be downloaded as a "snapshot," which in the case of extension lists can be burdensome. For example, even if the client device 120 has enough memory for the download, storing the "snapshot" reduces the remaining memory of the client device 120 available for performing other functions required of the client device 120. Additionally, downloading and uploading the "snapshot" of the entire whiteboard 114 impacts the bandwidth available for the client device 120, thereby reducing the availability of bandwidth for other functions required of the client device 120.

To reduce the processing, storage, and bandwidth requirements needed to access a collaboration session, such as the illustrated whiteboard 114, scalable collections 110 are provided herein. As will be described in greater detail below, the scalable collections 110 provided herein are part of a balanced tree data structure. Although this discussion describes scalable collections 110 as part of a SPICE tree data structure, it should be appreciated that the scalable collections 110 may be used as part of other balanced chunked tree data structures, such as AVL trees or Red-Black trees.

To address the shortcomings of conventional data structures, the scalable collections 110 arrange data corresponding to list content, such as the list content 126, in a framework that allows for efficient identification and access of target elements. As will be described in greater detail below with the respect to FIGS. 2-9, the scalable collections 110 allows the client devices 120 and 130 to access and modify target elements of the list content 126 within the whiteboard 114 that is navigated to. For example, if the user A via the first instance 106 of the document navigates to the element 128A within the list content 126, the scalable collections 110 access and provides only data corresponding to the element 128A. For example, the scalable collections 110 may provide elements proximate to the element 128A in the list content 126, such as the element 128B, but does not need to access and provide, via downloading, all elements within the list content 126. Since the user A has only navigated to the list element 128A, and non-proximate elements, such as element 128C, within the list content 126, as well as the other content within the whiteboard 114 are irrelevant to the user A at this given time, the balanced chunked tree data tree via the scalable collections 110 does not fetch (e.g., download), the data associated with the non-proximate elements or the other content. In other words, the scalable collections 110 is a reading protocol or framework for accessing and retrieving data corresponding to the content 116, in particular a framework for accessing and retrieving data corresponding to the list content 126.

Moreover, as will be described in greater detail below with respect to FIGS. 5A-9, the scalable collections 110 include a collection aggregator which provides information relating to list elements included within a given scalable collection. For example, if the scalable collections 110 organizes the elements 128A and 128B in a first chunk and the element 128C in a second chunk, the scalable collection 110 indicates that the elements 128A-C are sibling nodes to each other. As those skilled in the art readily appreciate, indicating sibling relationships between nodes within a data structure is crucial for efficient traversal, ordered access, and optimizing algorithms.

In some cases, a collection aggregator may also include non-local information used to compute an offset of a target element. For example, if the user A is accessing the element 128A, then the collection aggregator of a respective scalable collection 110 may include information used to compute an offset of the element 128A within the branch chunked tree data tree. That is, the collections aggregator may include information used by the scalable collection 110 to compute or dereference an offset of the element 128A in O(log n) time. Examples of collection aggregators are provided below in FIGS. 5A-9.

As illustrated, the scalable collections 110 is executed as part of the collaboration application. That is, when the user A initiates the first instance 106 of the document, the respective balanced chunked tree data structure including the scalable collections 110 is executed and run as part of the first instance 106. Similarly, when the user B initiates the second instance 108 of the document, the scalable collections 110 is executed and run as part of the second instance 106. As will be appreciated, in other examples, the balanced chunked tree data structure including the scalable collections 110 may be locally installed and executed by the client devices 120 and 130, may be remotely executed by the application service 102 when the client devices 120 and 130 initiate a collaboration session, or by any other application or function that is used to access and fetch data associated with the whiteboard 114 during a collaboration session.

Figure 2:
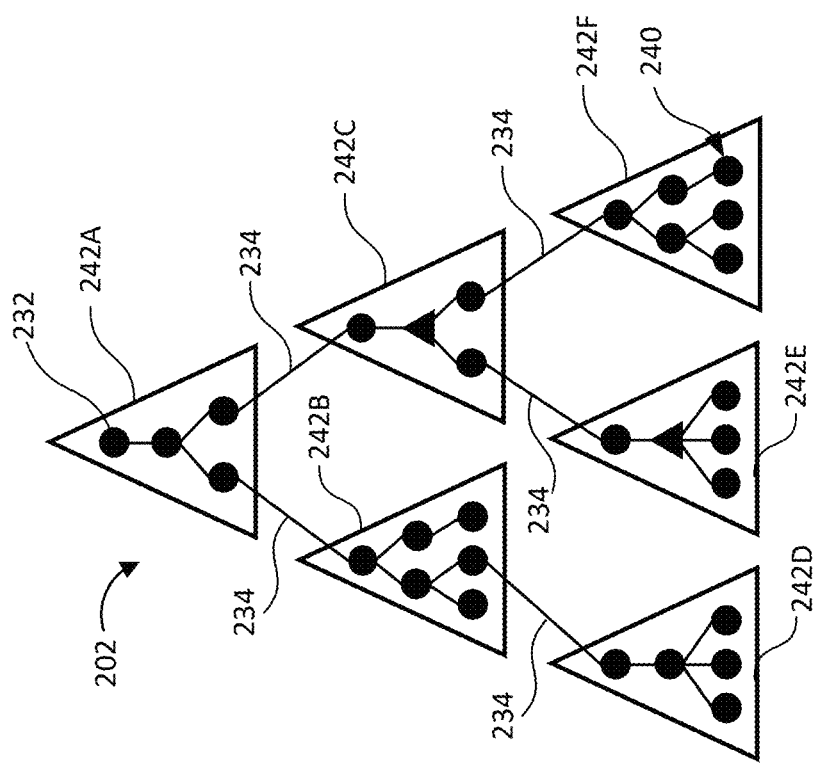
FIG. 2 provides an illustrative example of chunking data within a data structure, according to an embodiment provided herein.
Figure 2:
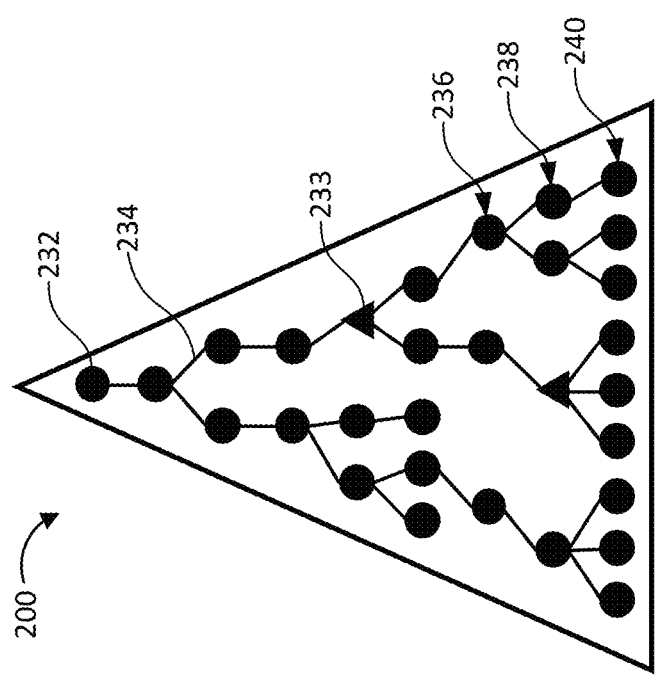
Figure 3:
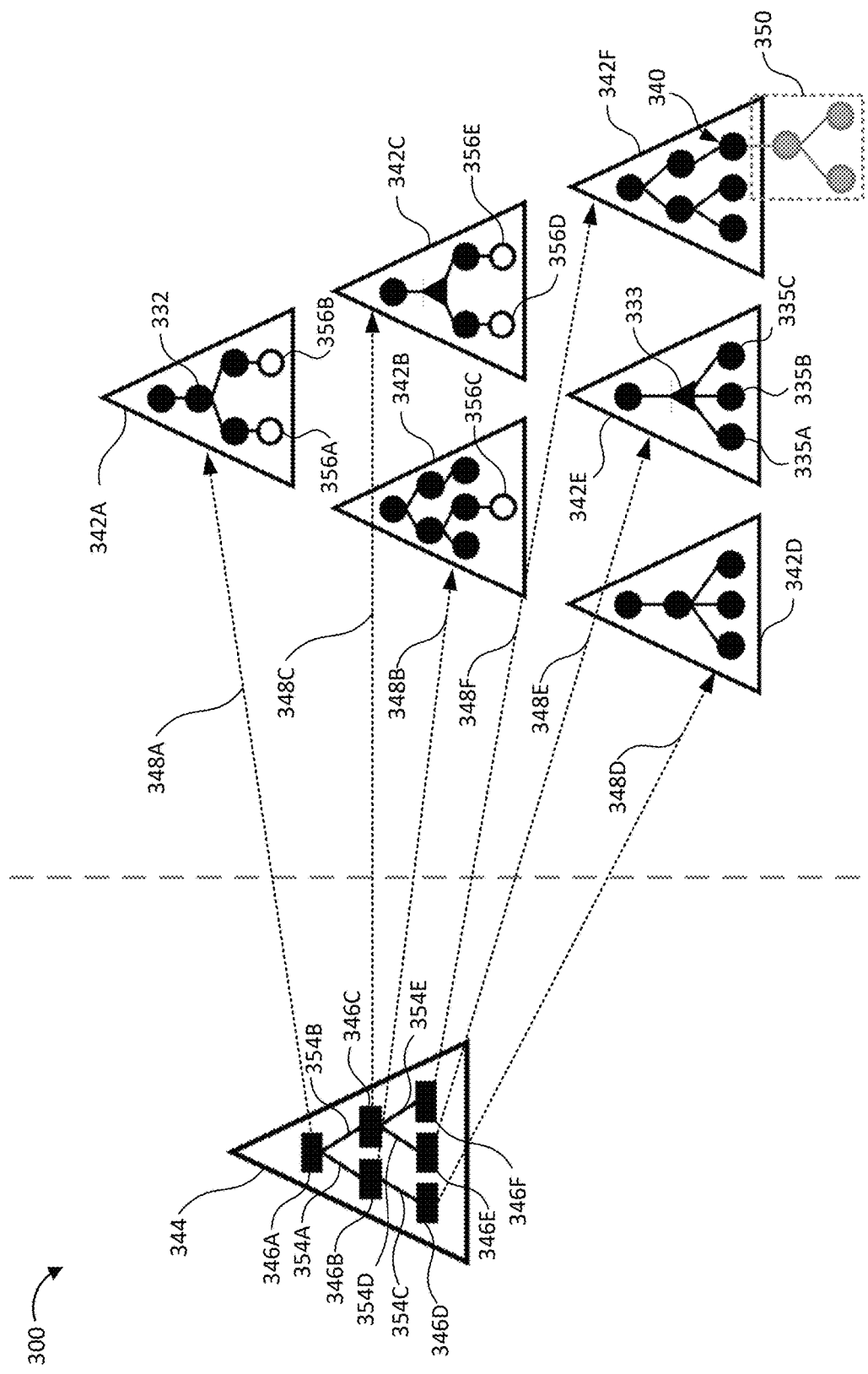
FIG. 3 illustrates an example balanced chunked tree data structure, according to an embodiment herein.
Figure 4:
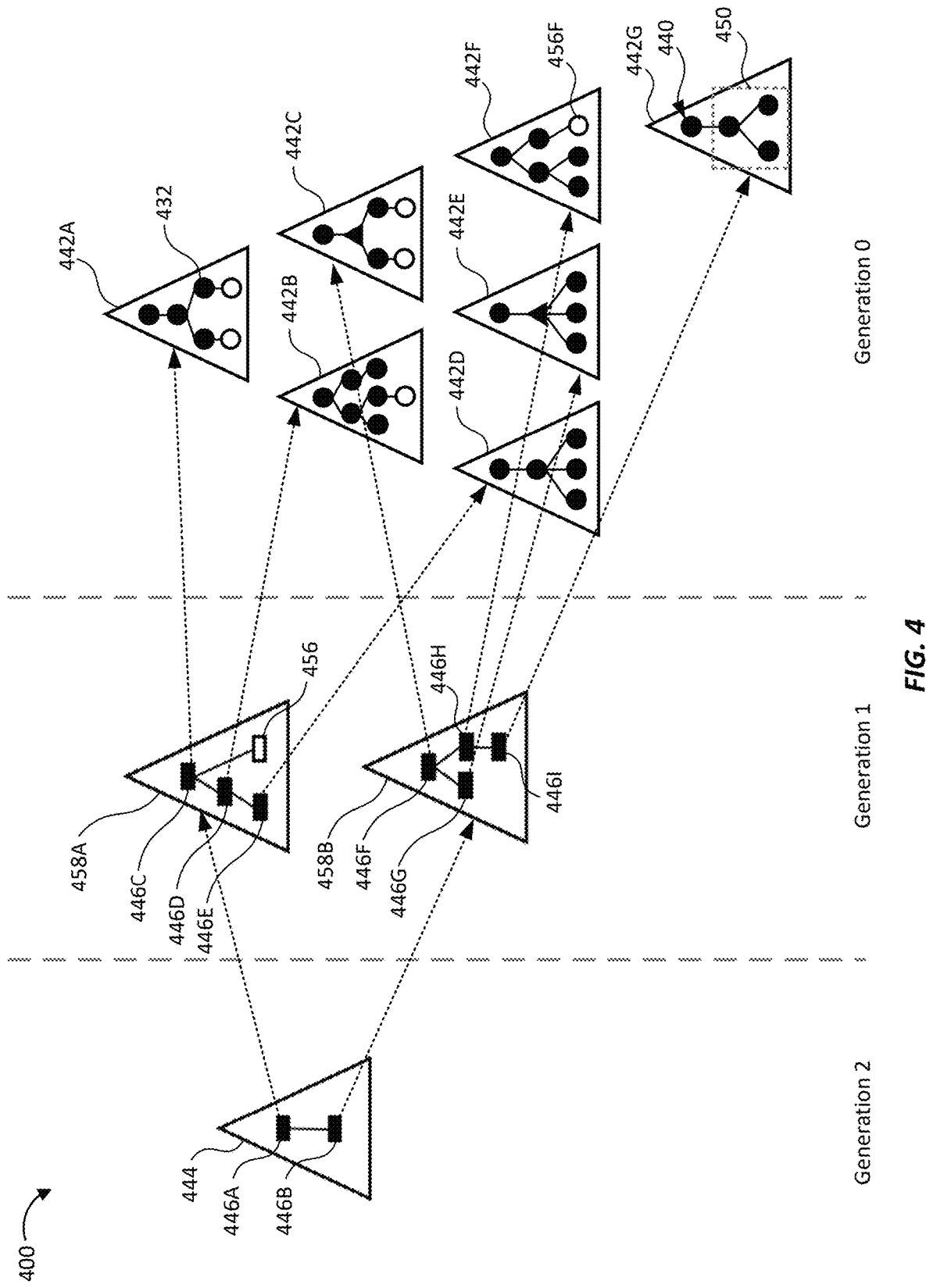
FIG. 4 illustrates another example balanced chunked tree data structure, according to an embodiment herein.

To provide context to the scalable collections 110, FIGS. 2-4 are referenced next. FIGS. 2-4 describe a balanced chunked tree data structure, specifically a general SPICE tree data structure, in which the scalable collections 110 may be created and executed. Starting with FIG. 2, FIG. 2 provides an illustrative example of chunking data within a data structure 200, according to an embodiment herein. As shown, the data structure 200 includes multiple nodes 232. The nodes 232 may be object nodes or list nodes, such as list nodes 233. Each of the nodes 232 corresponds to an object, such as a document attribute or element. As used herein, a document attribute includes one or more text, numbers, formulas, tables, ink, pictures, key/value maps, sets, links, audio, video, 3D models, text or paragraph formatting, color scheme, etc. The data structure 200 may correspond to a document, such as the whiteboard 114, and in such an example each of the nodes 232 may correspond to a document attribute of the whiteboard 114, such as the element 128A.

Each of the nodes 232 within the data structure 200 are connected via a link 234. The link 234 provides directions as to what nodes 232 are related to each other, such that when the data structure 200 is "read" by a respective reading protocol or software program that fetches data from the data structure 200, the program knows how the nodes fit together. For example, if node 236 is for text, then node 238 may be an object relating to the font for the text data within the node 236 and node 240 may be an object relating to the color for the text data within the node 236. Because the nodes 236, 238, and 240 are connected via links 234, then the software program reads them together to accurately generate text within the program for a viewing user having the correct font and text color. It should be noted that the nodes 236, 238, and 240 are illustrative embodiments of nodes 232.

Following conventional data structures and related techniques, when a document, such as the whiteboard 114 is accessed by a user, the entirety of the data structure 200 may be downloaded. As described, downloading the entirety of the data structure 200 may be resource intensive on the client devices 120 and 130 accessing the whiteboard 114. Although data structure 200 only includes thirty nodes 232, it should be appreciated that in real applications, the data structure 200 may include hundreds of thousands, if not millions, of nodes 232. The data structure 200 and the following data examples include a limited number of nodes 232 for ease of illustration and description.

Since each of the nodes 232 corresponds to a piece of data, each node 232 has a corresponding encoding size. Encoding size refers to the amount of data required to represent information (e.g., the nodes 232) in a particular format or encoding scheme. Typically, encoding size is measured in bits, bytes, or other units of digital storage. Since the data structure 200 may contain hundreds of thousands, if not millions of nodes 232, the total encoding size of the data structure 200 may be quite large. As such, downloading the entirety of the data structure 200 during a collaboration session can impact the resources of the accessing client device.

To mitigate the resources required to access a document, such as the whiteboard 114 during a collaboration session, the balanced chunked tree data structure splits the respective data into a data structure 202, which may be the same as the data structure 200, into multiple chunks 242A-F. Again, for ease of illustration, the data structure 202 is split into six chunks 242A-F, however, in reality the data structure 202 may be split into hundreds, if not thousands of chunks 242A-F depending on the number of nodes 232 present within the data structure 202. As will be described in greater detail below with respect to FIG. 3, the data structure 202 is split into six chunks 242A-F based on the encoding size of the nodes 232.

Chunking the data structure 202 as illustrated in FIG. 2 at this point is similar to conventional data structuring techniques. As shown, each of the chunks 242A-F are connected via links 234. As such, if a user navigates to a point in a document in which data corresponding to node 240 is required, the collaboration application must fetch data from all the intervening nodes between the node 232 and the node 240. Those skilled in the art may recognize this type of data structuring technique to be similar to a balanced tree ("B-tree") data structure. Under B-tree data structures, however, although the entirety of the nodes 232 within the data structure 202 are not used (e.g., viewed) by an accessing user to navigate to the node 240, all the intervening nodes 232 within the chunks 242A, 242C, and 242F are required, as well as all node descendants, which would include all of the nodes within the data structure 202. As such, such data structures and related techniques still have heavy processing, memory, and bandwidth costs.

Referring now to FIG. 3, an example balanced chunked tree data structure 300 is provided, according to an embodiment herein. The balanced chunked tree data structure 300 may be a SPICE tree data structure, and include a root chunk 344 and one or more of chunks 342A-F, which may be the same or similar to the chunks 242A-F. As shown, the root chunk 344 includes one or more radar nodes 346A-346F corresponding to a respective chunk 342A-F. That is, the root chunk 344 includes a radar node 346A providing a reference 348A to the chunk 342A, a radar node 346B providing a reference 348B to the chunk 342B, a radar node 346C providing a reference 348C to the chunk 342C, a radar node 346D providing a reference 348D to the chunk 342D, a radar node 346E providing a reference 348E to the chunk 342E, and a radar node 346F providing a reference 348F to the chunk 342F.

As noted above, the nodes 332 may be object nodes or list nodes. Nodes 332 that correspond to lists, also referred to herein as list content, are referenced as list nodes 333. Each child nodes 332 of a list node 333 may correspond to one of the elements in the list. child nodes of a list node 333 are referenced herein as child nodes 335. In an illustrative example, the list node 333 may correspond to the list content 126 and each of the child nodes 335A-C may correspond to a list element, such as elements 128A-C, within the list content 126.

As shown, each of the chunks 342A-F are not connected to an adjacent chunk by a link, such as was illustrated in FIG. 2 and described with respect to current data structuring techniques. Instead, to traverse between chunks 342A-F, a respective reference may be used. That is, if a user is navigating between content within a document corresponding to the node 340 on chunk 342F and the child node 335C in the chunk 342E, the reading protocol follows the reference 348F from the chunk 342F to the root chunk 344. In some embodiments, the root chunk 344 may already be in memory at the client device. As such, the reading protocol may navigate the downloaded root chunk 344 to follow the reference 348F directly to the radar node 346F.

Once at the root chunk 344, a respective reading protocol traverses from the radar node 346F to the radar node 346E, and then follows the reference 348E to the chunk 342E. The reading protocol then traverses through the nodes 332 of the chunk 342E until it reaches the child node 335C. As can be appreciated by this example, although the references 348A-F are illustrated as extending from the root chunk 344 to a respective chunk 342A-F, each reference 348A-F is a two-way reference between the chunks 342A-F and a respective radar node 346A-F within the root chunk 344.

The radar nodes 346A-F of the root chunk 344 are isomorphic of an arrangement of the chunks 342A-F. That is because the radar nodes 346A-F are proxies for the data within each of the chunks 342A-F, and thus the relational arrangement of the radar nodes 346A-F mirrors that of the chunks 342A-F. Depending on the relational arrangement of the chunks 342A-F, the radar nodes 346A-F are connected via links 354A-E. For example, the link 354A connects the radar node 346A to the radar node 346B, thereby indicating that the content corresponding to the nodes 332 in the chunk 342A is related to the content corresponding to the nodes 332 in the chunk 342B. For example, the content corresponding to the nodes 332 in the chunk 342A may be on a first page of a document and the content corresponding to the nodes 332 in the chunk 342B may be on a second page. The link 354A therefore indicates to the reading protocol to traverse from the radar node 346A to the radar node 346B, and thus to the nodes 332 on the chunk 342A via the reference 348B when a user scrolls from the first page of the document to the second page.

In addition to the nodes 332, one or more of the chunks 342A-F may include a placeholder node 356A-E. A placeholder node 356A-E may include a reference directing the reading protocol to traverse upstream to an ancestor chunk (e.g., to a respective node in a higher generation chunk), here to the root chunk 344, to identify a path to the next node 332. As will be described in greater detail below with respect to FIG. 5, when a placeholder node 356A-E is encountered, such as the placeholder 356A on the chunk 342A, the reading protocol is directed back to the root chunk 344 to determine the next step. As illustrated, the arrangement of the placeholder nodes 354A-E within the chunks 342A-F provides context on the relationship of the nodes 332 between the chunks 342A-F. For example, if the reading protocol traverses through the nodes 332 on the chunk 342A and reaches the placeholder node 356A, the position of the placeholder node 356A includes a reference directing a reading protocol to return to the root chunk 344 and traverse via the link 354A to the radar node 346B. Similarly, if the reading protocol traverses through the nodes 332 on the chunk 342A and reaches the placeholder node 356B, the position of the placeholder node 356B includes a reference directing the reading protocol to return to the root chunk 344 and traverse via the link 354B to the radar node 346C.

The balanced chunked tree data structure 300 can have any shape by maintaining a self-organizing hierarchy of approximations of the logical tree at increasingly coarse levels of detail. That is, the balanced chunked tree data structure 300 is a self-organizing data structure that rebalances itself based on the addition or reduction of nodes 332.

Nodes 332 are added to the balanced chunked tree data structure 300 when content is added to the document (e.g., the whiteboard 114) and nodes 332 are removed from the balanced chunked tree data structure 300 when content is removed from the document. Additionally, as illustrated, the chunks 342A-F and the root chunk 344 are arranged in a hierarchical arrangement with the root chunk 344 as a parent to the chunks 342A-F, while the chunks 342A-F themselves have parent, child, and sibling relationships.

As noted above, the balanced chunked tree data structure 300 is a self-organizing data structure that rebalances itself. Rebalancing of the balanced chunked tree data structure 300 means that the balanced chunked tree data structure 300 adds and subtracts chunks 342A-F to maintain chunks of the same encoding size. That is, as content is edited within a document, nodes 332 are added or reduced from the balanced chunked tree data structure 300. As nodes 332 are added or subtracted, the encoding size of a given chunk changes. For example, if content is added to the document, nodes 350 are added to the balanced chunked tree data structure 300. Since the nodes 350 relate to the node 340, the nodes 350 are associated with chunk 342F. However, if the nodes 350 were added to the chunk 342F, the chunk 342F would no longer be in the same size range as other chunks 342A-E, thus making the balanced chunked tree data structure 300 unbalanced.

To balance, the balanced chunked tree data structure 300, the nodes 332 and the chunks 342A-F are automatically rebalanced based on the encoding size of the present nodes 332. Rebalancing is a process of splitting and/or merging chunks to maintain the chunks in a desired size range. The nodes 332 are chunked into respective chunks 342A-F based on a variety of factors, such as an encoding size and a maximum depth of the Balanced chunked tree data structure 300.

In an example implementation, the number of nodes 332 present within a given chunk of the chunks 342A-F is determined by an encoding size equation, such as follows:

$$N=(2+b) \times n$$

where, N is the number of nodes 332 within a given chunk, n is an encoding size of a node 332, and b is a buffer factor. As noted above, the encoding size is generally in bytes. The buffer factor, b, may be set on an application basis, a document basis, or the resource requirements of devices handling the balanced chunked tree data structure 300, such as the database 112, the application service 102, or the client devices 120 and 103. In an example, the buffer factor is 0.1, 0.2, 0.3, 0.4, or 0.5.

During the chunking operation, including rebalancing the balanced chunked tree data structure 300, it is assumed that all the nodes 332 are the same size. In reality, however, the nodes 332 may be different sizes, and thus the buffer factor, b, provides a buffer for the nodes 332 to vary slightly in size. The buffer factor also allows for minor edits to be made to data without causing rebalancing of the balanced chunked tree data structure 300. As can be appreciated, without the buffer factor, b, the smallest of modifications to content within a document could cause constant rebalancing. As such, the buffer factor, b, allows for some encoding size leeway before rebalancing the nodes.

In some embodiments, data is chunked into the chunks 342A-F based on the document data format. That is, nodes 332 that correspond to adjacent document attributes that are within a proximity limit to each other within a document may be grouped together. For example, the nodes 332 within the chunk 342F correspond to document attributes relating to the same content within a document, such as text within a given paragraph. That is, one of the nodes 332 may relate to text of the paragraph, the other nodes may relate to the formatting of the font and paragraph formatting for the paragraph.

As illustrated, the balanced chunked tree data structure 300 includes a depth of two layers or generation levels. Generation level one is the least granular component of the balanced chunked tree data structure 300, providing the root chunk 344 including only radar nodes 346A-F. In other words, generation level one only provides directions as to where nodes 332 can be found but does not provide any nodes 332 itself. Only by following the references 348A-F are the nodes 332 encountered at generation zero. Generation level zero, or the second layer of the balanced chunked tree data structure 300, includes more granularity than generation one because it provides the nodes 332 that can direct a reading protocol to the specific document data.

As noted above, another consideration during a rebalancing process is the depth of the balanced chunked tree data structure 300. For example, the balanced chunked tree data structure 300 rebalances to maintain a uniform depth. In preferred examples, the depth of the balanced chunked tree data structure 300 remains relatively shallow, such as containing less than five generations, less than four generations, or less than three generations. To maintain a uniform depth that is relatively shallow, a rebalancing process may be accomplished as an O(k log n) operation, where n is the number of chunks covered by content added to the document (e.g., additional content) and/or content removed from the document (reductional content) and k is proportional to the average number of document attributes (e.g., nodes 332) per chunk 342A-F.

As can be appreciated, when content is removed from a document (e.g., reductional content), nodes 332 are removed from a respective chunk 342A-F. When the chunk 342A-F reaches an encoding size that is below an encoding floor threshold, then the nodes 332 remaining in the respective chunk 342A-F is merged into another chunk 342A-F. In other words, when the chunk 342A-F falls below an encoding floor threshold and reaches an encoding size that is too small, then the remaining nodes 332 are merged into another chunk 342A-F. In particular, the remaining nodes 332 are merged into an adjacent chunk 342A-F. In some cases, an adjacent chunk 342A-F having the lowest encoding size is selected for merging since merging the remaining nodes 334 into an adjacent chunk 342A-F requires the lowest number of rebalancing steps.

When content is added to a document (e.g., additional content), new nodes 350 are added to the balanced chunked tree data structure 300. As noted above, the nodes 352 correspond to the node 340. As such, the new nodes 350 are added following the node 340. Adding the new nodes 350 to the chunk 342F causes the encoding size of the chunk 342F to be above an encoding threshold. That is, adding the new nodes 350 to the chunk 342F causes the encoding size of the chunk 342F to be too large. As such, the new nodes 350 may be temporarily added to the chunk 342F, upon which an encoding threshold is reached or exceeded, causing the balanced chunked tree data structure 300 to rebalance.

As can be appreciated, the encoding floor threshold and the encoding threshold may be the bounds of an acceptable encoding size for a given chunk of data. That is, the encoding floor threshold may be a lower bound and the encoding threshold may be an upper bound for the range of encoding sizes acceptable within a given chunk. Since the balanced chunked tree data structure 300 is a self-balancing data structure, each of the chunks 342A-F may be approximately the same encoding size. Thus, each of the chunks 342A-F may have an encoding size that falls between an encoding floor threshold and an encoding threshold. The threshold limits for both the encoding floor threshold and the encoding threshold may be set on an application basis, document basis, or the resource requirements of devices handling the Balanced chunked tree data structure 300, such as the database 112, the application service 102, or the client devices 120 and 130.

To accommodate the new nodes 350 within the balanced chunked tree data structure 300, the Balanced chunked tree data structure 300 rebalances itself to add at least another chunk. Referring now to FIG. 4, another example balanced chunked tree data structure 400 is illustrated, according to an embodiment herein. In the illustrated example, the balanced chunked tree data structure 400 may be a rebalanced version of the balanced chunked tree data structure 300. As shown, to accommodate new nodes 450, which may be the same as the new nodes 350, the balanced chunked tree data structure 400 rebalances to add a chunk 442G. The chunk 442G is added to chunks 442A-F, which may be the same or similar to the chunks 342A-F.

Beyond rearranging to simply add another chunk 442G to include the new nodes 450, the balanced chunked tree data structure 400 rebalances to add another generation or layer. Here, two reference chunks 458A and 458B are added to the balanced chunked tree data structure 400. Instead of adding another radar node 346A-E to the root chunk 344, the reference chunks 458A and 458B are added to the balanced chunked tree data structure 400. Since chunking the data is meant to allow for quick retrieval of only accessed portions of a document, rebalancing the balanced chunked tree data structure 400 as illustrated, allows a reading protocol to easily and directly identify, access, and fetch data associated with respective nodes 442 without having to navigate through multiple chunks 342A-F and nodes 332.

In the illustrated example, the reference chunks 458A and 458B are generated by splitting the root chunk 344. That is, the root chunk 344 is split into the two reference chunks 458A and 458B. In some cases, one of the reference chunks 458A and 458B may retain the identity of the root chunk 344. For example, in such a scenario, the reference chunks 458A and 458B may be identified as reference chunk 458A and reference chunk 344. Since one or more of the reference chunks 458A and 458B may retain the identity of the reference chunk 344, and the reference chunks 458A and 458B are generated by the splitting of the reference chunk 344, a new root chunk 444 is generated. Alternately, the new root chunk 444 may inherit the identity of the root chunk 344.

As shown, the root chunk 444 now includes two radar nodes 446A and 446B, each of which provides a reference to the reference chunks 458A and 458B, respectively. Then, each of the reference chunks 458A and 458B includes one or more radar nodes 446C-I, each of which includes a reference pointing to a respective chunk 442A-G. Since the reference chunks 458A and 458B are adjacent, in that they provide directions to content that is adjacent or related within the respective document, the reference chunk 458A includes a placeholder node 456. When the placeholder node 456 is encountered, the placeholder node 456 provides a reference back to the root chunk 444, where the reading protocol is directed to traverse to the radar node 446B to continue fetching data.

As is noted above, the new nodes 450 contain data corresponding to content that is adjacent or related to the content associated with node 440. As such, during the rebalancing, the node 440 is chunked with the new nodes 450 in the chunk 442G. To link the object nodes 432 in the chunk 442F with the node 440 (as they are also adjacent or related to each other), a placeholder node 456F is placed in the chunk 442F where the node 340 was previously in FIG. 3. The placeholder node 456F provides a reference to direct the reading protocol, when encountered, to return to the reference chunk 458B and traverse from the radar node 446H to the new radar node 446I. Following the radar node 446I, the reading protocol is directed to the node 440 on the chunk 442G.

As noted above, in some cases the nodes 432 are or include one or more list nodes. List nodes correspond to list elements that are part of list content, such as the list content 126. As can be appreciated, list content often includes numerous list elements, ranging from a few dozen to hundreds of millions of list elements. Conventional data structures often struggle to accommodate the variability in size of list, and shape and size of list elements. Moreover, to navigate to a target list element, conventional data structures often require loading all list elements, which in the case of an extensive list, can be burdensome with respect to processing and latency requirements, as described above. Conventional data structures not only require loading the entirety of list elements within a respective list content, to access a target list element, but also load all list elements merely to identify where the target list element is within the list content.

To address at least these issues, a scalable collection may be used within a balanced chunked tree data structure. For example, a scalable collection, such as the scalable collection 110, may be used within the balanced chunked tree data structure 300 or 400. Turning now to FIGS. 5A-F, an example environment in which a scalable collection 110 within a balanced chunked tree data structure is created and implemented is illustrated, according to an embodiment herein.

Starting with FIG. 5A, an example balanced chunked tree data structure 500 (hereinafter "data structure 500") is illustrated, according to an embodiment herein. As shown, the data structure 500 includes a root chunk 544 containing multiple radar nodes 546A-546E. Each of the radar nodes 546A-E provides a reference to a respective reference chunk (not shown) or chunk. For ease of illustration and discussion only radar node 546A providing reference to a chunk 542A is shown.

The chunk 542A includes numerous nodes 532, including a list node 533A. The list node 533A may correspond to list content, such as the list content 126. For each element within the list content 126, such as elements 128A-C, the list node 533A may include a respective child node 535A-D (also referred to herein as child nodes 535A-D). That is, the element 128A may correspond to the child node 535A, the element 128B may correspond to the child node 535B, and the element 128C may correspond to the child node 535C. As can be appreciated, in some cases one or more of the child nodes 535A-D may correspond to attributes or properties (e.g., font, size) of a list element.

As illustrated, the list node 533A and its corresponding child nodes 535A-D form a scalable collection. That is, as used herein a scalable collection may refer to the portion of the data structure 500 corresponding to list content. In particular, a scalable collection may correspond to the components of the data structure 500 (e.g., list node 533A, child nodes 535A-D, associated nodes 532A) that are associated with a single list content. As such, the data structure 500 may have multiple scalable collections, each corresponding to different list content. Again, as used herein list content refers to a list (e.g., catalog, inventory, register, index, record, array) containing numerous list elements (e.g., values, numbers, digits).

As additional list elements are added to the respective list content, a scalable collection may add additional child nodes to the list node 533A. For example, if prior to a modification by the user A to the list content 126, the list node 533A only includes the child nodes 535A and D. During the modification, the user A adds list elements corresponding to the child nodes 535B and 535C. As such, the scalable collection 110 adds the child nodes 535B and 535C to the chunk 542A as children of the list node 533A. By locating or creating the child nodes 535B and 535C as children to the list node 533A, thereby creating a parental relationship between the nodes 533A, 535B, and 535C, the scalable collections indicates that the child nodes 535B and 535C are siblings and therefore related to the nodes 535A and 535D. As those skilled in the art readily appreciate, sibling relationships play a pivotal role in identifying and retrieving data elements in an efficient manner.

When the child nodes 535B and 535C, along with their associated nodes 532A are added to the chunk 542A, the data structure 500 rebalances. In an illustrative example, when the child nodes 535B-C are added to the chunk 542A, an encoding size of the chunk 542A may exceed an encoding threshold. As described above, when an encoding threshold is exceeded, the data structure 500 may rebalance by adding another chunk. As part of the rebalancing process, the data structure 500 may determine to move portion 560A of the chunk 542A to a new chunk.

Referring now to FIG. 5B, FIG. 5B illustrates a new chunk 542B that is added as part of the rebalancing process of the data structure 500. As shown, the chunk 542B includes the child nodes 535B and 535C, along with their associated nodes 532A. The associated nodes 532A includes a placeholder node 556A, which corresponds to the radar node 546D in the root chunk 544. As described above, the placeholder node 556A may be used by a reading protocol to traverse from the chunk 542A in FIG. 5A or chunk 542B in FIG. 5B back to the root chunk 544 and down to the radar node 546D which directs the reading protocol to a chunk associated with the radar node 546D (not shown).

Since the data structure 500 added the chunk 542B, the root chunk 544 generates a new radar node 546F associated with the chunk 542B. That is, the radar node 546F includes a reference that directs a reading protocol to the chunk 542B when the reading protocol seeks data or elements associated with the child nodes 535B-C or their associated nodes 532A.

As shown, within the chunk 542A, a placeholder chunk 556B is generated in place of the child nodes 535B-C and associated with the list node 533A. Since the child nodes 535B-C are children of the list node 533A, thereby indicating that they correspond to list elements, the placeholder chunk 556B is illustrated herein as a triangle. It should be appreciated that while various illustrations are used for different types of nodes (e.g., the list nodes, placeholder nodes corresponding to lists, radar nodes, object nodes), this is done for ease of illustration and in reality, may not take different forms within the data structure 500 itself. Similarly, the chunk 542B is illustrated as having a different shape than the chunk 542A because the chunk 542B corresponds to list elements (e.g., includes child nodes 535B-C) merely for illustrative purposes. In reality, the chunk 542B may function the same as the chunk 542A.

Since the child nodes 535B-C are siblings to the child nodes 535A and 535D, the scalable collection includes a collection aggregator 552A. The collection aggregator 552A may include a generation level at which other related child nodes, here child nodes 535A and 535D, can be found. In the illustrated example, all of the child nodes 535A-D are siblings to one another at the generation level zero. This may also be referred to as a sibling generation level. As will become more evident in the following Figures and discussion, the collection aggregator 552A provides important information to a reading protocol with respect to the hierarchy of child nodes within a scalable collection, and how the scalable collection fits in the over data structure 500.

Figure 5C:
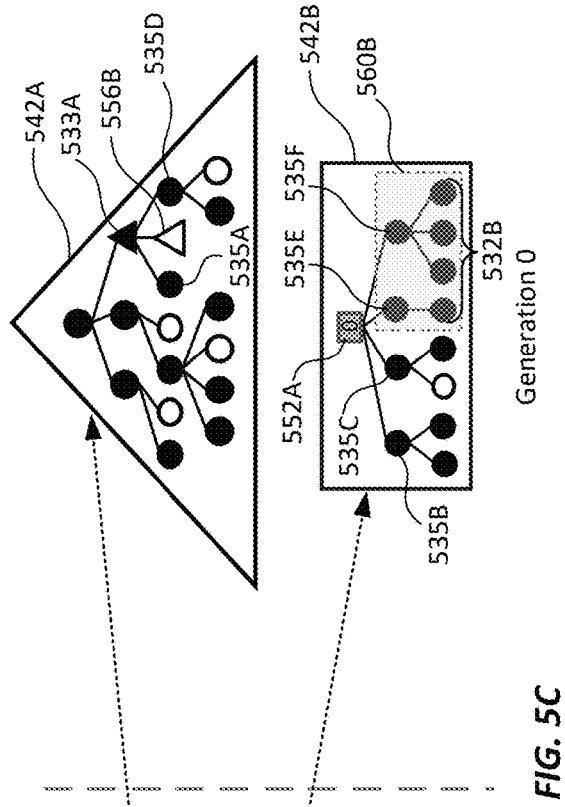
Figure 5C:
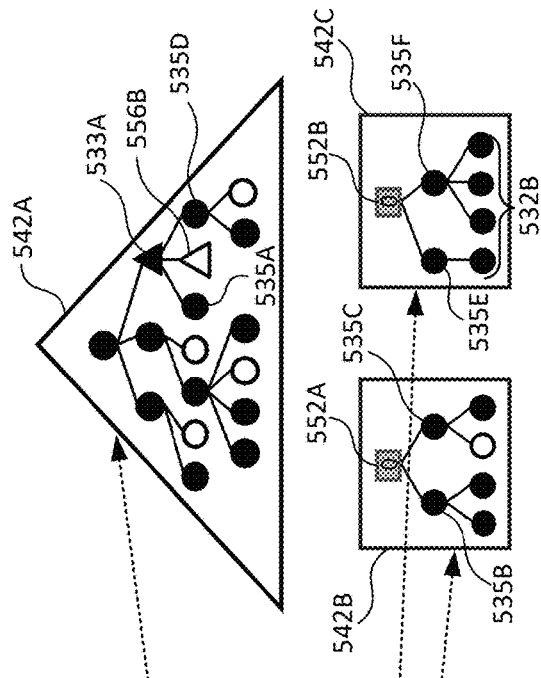

Turning now to FIG. 5C, FIG. 5C illustrates a modification made to the scalable collection, according to an embodiment herein. For example, the illustrated modification may involve adding new list elements to a corresponding list content, such as the list content 128. As such, the scalable collection is modified to add new child nodes 535E and 535F. The new child nodes 535E and 535F may be added to a scalable collection based on their relational proximity to the other child nodes 535A-D. For example, if the child node 535C corresponds to the list element 128A and the child node 535D corresponds to the list element 128B, then the child nodes 535E-F may correspond to list elements that are added between the list element 128A and 128B. As can be appreciated, list elements may be added or removed from list content in various manners, and the addition or removal of child nodes from a respective scalable collection may correspond to the manner in which the list elements are modified within the list content. Since the child nodes 535E-F are siblings to the child nodes 535A-D, thus associated with the same list content as the child nodes 535A-D, the collection aggregator 552A indicates that all of the child nodes 535A-F are siblings at the generation level zero.

When the child nodes 535E and 535F, along with their associated nodes 532B are added to the chunk 542B, the data structure 500 may rebalance. In an illustrative example, when the child nodes 535E-F are added to the chunk 542B, an encoding size of the chunk 542B may exceed an encoding threshold. As described above, when an encoding threshold is exceeded, the data structure 500 may rebalance by adding another chunk. As part of the rebalancing process, the data structure 500 may determine to move portion 560B of the chunk 542B to a new chunk.

Figure 5D:
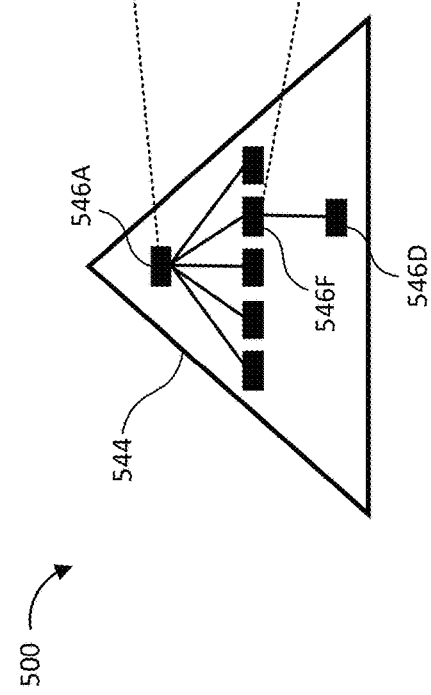
Figure 5D:
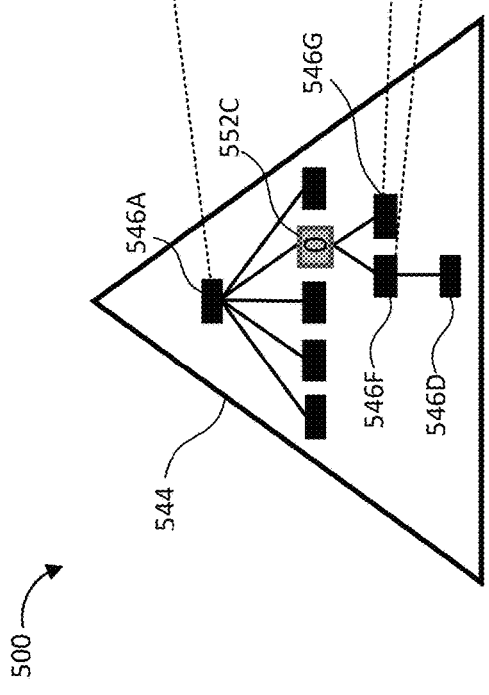

Referring now to FIG. 5D, FIG. 5D illustrates a new chunk 542C added to the data structure 500 as part of a rebalancing process responsive to the modification of FIG. 5C, according to an embodiment herein. As illustrated, the chunk 542B of FIG. 5C is vertically split into the chunks 542B and 542C of FIG. 5D. In particular, the child nodes 535E-F, along with their associated nodes 532B, are separated into the chunk 542C, while the child nodes 535B-C and their associated nodes 532B, remain in the chunk 542B.

Since the data structure 500 added the chunk 542C, the root chunk 544 generates a new radar node 546G associated with the chunk 542C. That is, the radar node 546G includes a reference that directs a reading protocol to the chunk 542C when the reading protocol seeks data or elements associated with the child nodes 535E-F or their associated nodes 532B.

As shown, the scalable collection now includes multiple collection aggregators 552A-C. In particular, each of the chunks 542B and 542C includes the collection aggregator 552A and 552B, respectively. As described above, the collection aggregators 552A-B indicate that the child nodes 535B-F are siblings to the child nodes 535A and 535 D at the generation level zero, thus including the value "0."

The scalable collection also includes a collection aggregator 552C that is part of the root chunk 544. That is, instead of the root chunk 544 only including the radar nodes 546F and 546G, which provide references to the chunks 542B and 542C, respectively, the root chunk 544 also includes the collection aggregator 552C. As shown, the radar nodes 546F and 546G depend from the collection aggregator 552C or are otherwise associated with the collection aggregator 552C within the root chunk 544. The collection aggregator 552C indicates that the chunks 542B and 542C include child nodes, here 535B-F, that are siblings to child nodes (e.g., child nodes 535A and 535D) within a chunk associated with the radar node 546A (e.g., chunk 542A). In other words, since the collection aggregator 552C is linked or otherwise depends from the radar node 546A, the collection aggregator 552C provides information to a reading protocol that the radar nodes 546F and 546G contain the child nodes 535B-F that are siblings to the child nodes 535A and 535D within the chunk 542A.

As can be appreciated, as the depth of the data structure 500 increases, thus more generation levels are added, the collection aggregators 552A-C become more vital to the reading protocol when seeking list elements corresponding to child nodes.

Turning now to FIGS. 5E-F, FIG. 5E illustrates another modification made to the scalable collection, according to an embodiment herein. For example, the illustrated modification may correspond to additional list elements being added to a corresponding list content, such as the list content 128. As such, the scalable collection is modified to add new child nodes 535G, 535H, and 535I. The new child nodes 535G, 535H, and 535I may be added to a scalable collection based on their relational proximity to the other child nodes 535A-F. For example, if the child node 535F corresponds to the list element 128A and the child node 535D corresponds to the list element 128B, then the child nodes 535G-I may correspond to list elements that are added between the list element 128A and 128B. As noted above, list elements may be added or removed from list content in various manners, and the addition or removal of child nodes from a respective scalable collection may mirror or correspond to the manner in which the list elements are modified within the list content. Since the child nodes 535G-I are siblings to the child nodes 535A-F, thus associated with the same list content as the child nodes 535A-F, the collection aggregators 552A-C indicates that all of the child nodes 535A-I are siblings at the generation level zero, as described above.

When the child nodes 535G-I, along with their associated nodes 532C, are added to the chunk 542C, the data structure 500 may rebalance. In an illustrative example, when the child nodes 535G-I are added to the chunk 542C, an encoding size of the chunk 542C may exceed an encoding threshold. As described above, when an encoding threshold is exceeded, the data structure 500 may rebalance by adding another chunk. As part of the rebalancing process, the data structure 500 may determine to move portion 560C of the chunk 542C to a new chunk.

Referring now to FIG. 5F, FIG. 5F illustrates a new chunk 542D added to the data structure 500 as part of a rebalancing process responsive to the modification of FIG. 5E, according to an embodiment herein. As illustrated, the chunk 542C of FIG. 5E is vertically split into the chunks 542C and 542D of FIG. 5F. In particular, the child nodes 535G-I, along with their associated nodes 532C, are separated into the chunk 542D, while the child nodes 535E-F and their associated nodes 532B, remain in the chunk 542B. As shown, the scalable collection adds a new collection aggregator 552D that is part of the chunk 542D to indicate that the child nodes 535G-I are siblings to the child nodes 535A-F.

Since the data structure 500 added the chunk 542C, the root chunk 544 generates a new radar node 546H associated with the chunk 542D. That is, the radar node 546H includes a reference that directs a reading protocol to the chunk 542D when the reading protocol seeks data or elements associated with the child nodes 535G-I or their associated nodes 532C. The radar node 546H is linked to the collections aggregator 552C to indicate that the child nodes 535G-I are related to the child nodes in the associated chunks of the radar nodes 546A, 546F, and 546G, as described above.

Turning now to FIGS. 6A-6D, an illustrative flow of modifications made to a data structure 600 are illustrated, according to an embodiment herein. As illustrated, FIG. 6A includes the data structure 600, which may be the same or similar to the data structure 500. The data structure 600 includes a root chunk 644 having radar nodes 646A-E. The radar node 646A includes a reference that directs to a chunk 642A, radar node 646B includes a reference that directs to a chunk 642B, radar node 646C includes a reference that directs to a chunk 642C, radar node 646D includes a reference that directs to a chunk 642D, and radar node 646E includes a reference that directs to a chunk 642E.

The chunk 642A includes multiple nodes 632. One of the nodes 632 is a first list node 633A. The chunk 642A also includes two placeholder nodes 656A and 656B. As illustrated, the placeholder node 656A may be a placeholder node for child nodes associated with the first list node 633A. As described above, when a reading protocol encounters one of the placeholder nodes 656A and 656B, the reading protocol returns to the root chunk 644 and traverses between the respective radar nodes. Here, if the reading protocol seeks the child nodes of the first list node 633A, the reading protocol traverses back to the root chunk 644, and from the radar node 646A to the radar node 646B. From the radar node 646B, the reading protocol traverses to the chunk 642B.

The chunk 642B includes child nodes 635A-D that are children to the first list node 633A. Thus, the first list node 633A and the child nodes 635A-D may be a first scalable collection within the data structure 600. As shown, the first scalable collection includes a first collection aggregator 652A that indicates that the child nodes 635A-D are siblings at a first generation level, here generation level zero.

If the reading protocol, at chunk 642A followed the nodes 632 to the placeholder node 656B, then the reading protocol may traverse back to the root chunk 644 and from the radar node 646A to the radar node 646C. From the radar node 646C, the reading protocol may traverse to the chunk 642C. As illustrated, the chunk 642C includes a second list node 633B and two placeholder nodes 656C and 656D. The placeholder node 656D is associated with the second list node 633B, such to indicate that at least some of the child nodes of the second list node 633B can be found in a separate chunk. For example, to fetch or find the child nodes of the second list node 633B, a reading protocol may traverse from the placeholder node 656D back to the root chunk 644, traverse from the radar node 646C to the radar node 646E, and traverse to the chunk 642E.

As shown, the chunk 642E includes child nodes 637A-D that are children to the second list node 633B. Thus, the second list node 633B and the child nodes 637A-D may be a second scalable collection within the data structure 600. As shown, the second scalable collection includes a second collection aggregator 652B that indicates that the child nodes 637A-D are siblings at a first generation level, here generation level zero.

If the reading protocol, at chunk 642C traversed through the nodes 632 of the chunk 642C to the placeholder node 656C, the reading protocol may traverse back to the root chunk 644, traverse from the radar node 646C to the radar node 646D, and traverse from the radar node 646D to the chunk 642D.

Figure 6A:
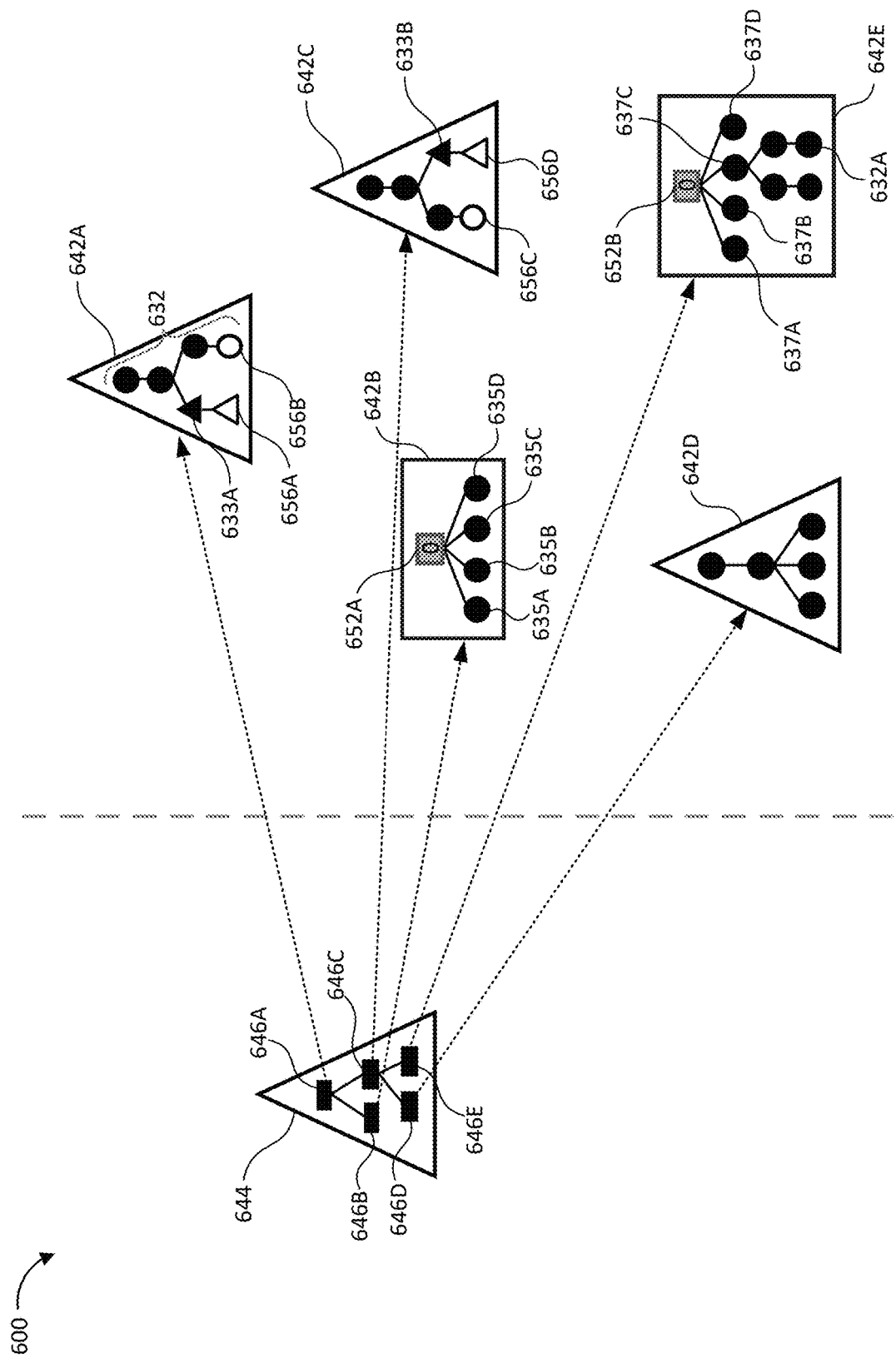
FIGS. 6A-D provides an illustrative flow of modifications made to a data structure, according to an embodiment herein.
Figure 6B:
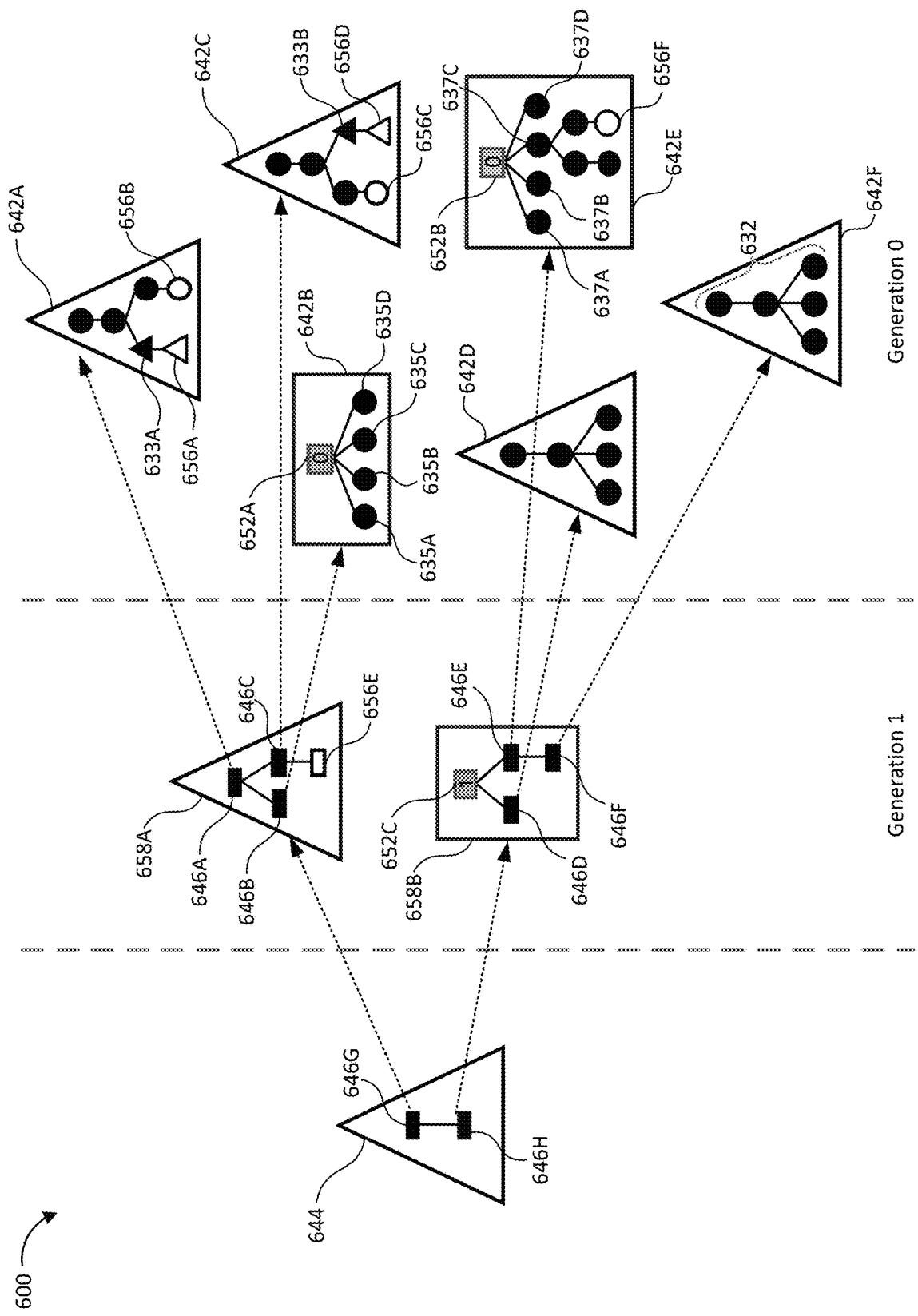

In the illustrated flow of FIGS. 6A-D, the content within a respective document, such as the whiteboard 114, may be modified such that additional, related nodes are added to the node 632A in the chunk 642E. When the additional nodes are added, such to be linked to the node 632A, the data structure 600 rebalances, as described above. Turning now to FIG. 6B, the data structure 600 as rebalanced is illustrated. In particular, a new chunk 642F is added to the data structure 600. The nodes 632 that are in the chunk 642F may correspond to the content that was added to the node 632A within the chunk 642E. As illustrated, to indicate that the nodes 632 of the chunk 642F are linked to the nodes within the chunk 642E, chunk 642E now includes a placeholder node 656F.

Instead of adding another radar node to the root chunk 644, the data structure 600 may have rebalanced to add another generation level. As illustrated, the nodes 632 may remain at generation level zero, while the root chunk 644 moves from the generation level one, as illustrated in FIG. 6A, to the generation level two, as illustrated in FIG. 6B. The root chunk 644 now includes two radar nodes 646G and 646H. The radar node 646G includes a reference to a reference chunk 658A. The reference chunk 658A includes the radar nodes 646A-C, and a placeholder node 656E that directs the reading protocol back to the root chunk 644 and to the radar node 646H.

The radar node 646H includes a reference to a reference chunk 658B. The reference chunk 658B includes a collection aggregator 652C from which reference chunks 646D and 646E link. The collection aggregator 652C indicates that the chunk 642D and chunk 642E are siblings within the generation level one. As can be appreciated, indicating that the radar nodes 646D and 646E are siblings at the generation level one may be vital to the reading protocol when traversing between nodes of the data structure 600, in particular with efficiently traversing between nodes. For example, in the illustrated example, the collection aggregator 652C indicates that the nodes of chunk 642D are linked from the placeholder 656C of the chunk 642C and the nodes of the chunk 642E are linked from the placeholder 656D. In conventional data structures, the radar nodes 646D-E may be linked directly from the radar node 646C, however, due to the balancing/chunking process of the data structure 600, the reading protocol traverses up to the root 644 when reading between the radar node 646C and the radar nodes 646D-E. To indicate the relationship between the radar nodes 646C-D, the reference chunk 658B includes the collection aggregator 652C.

Figure 6C:
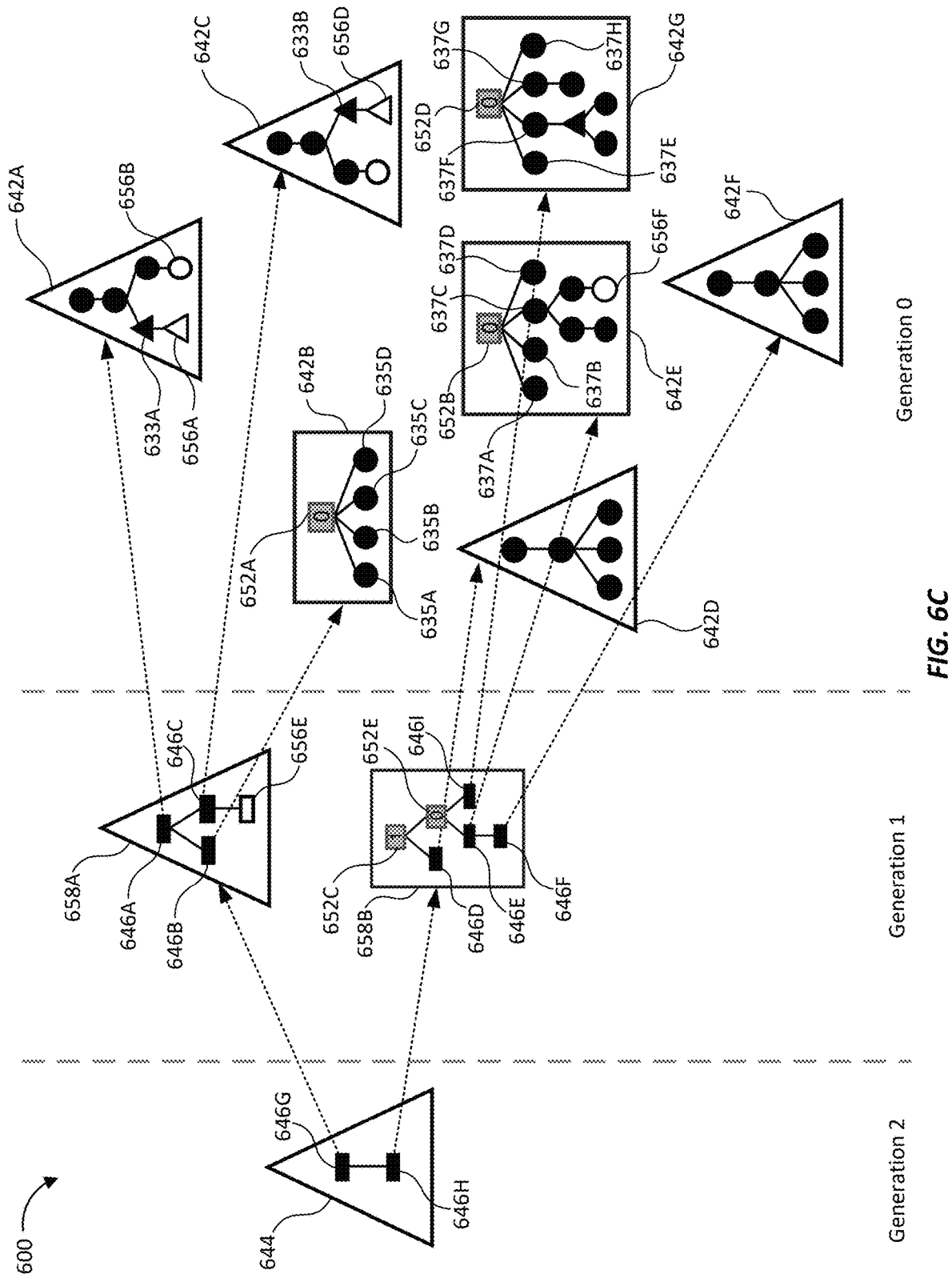

Turning now to FIG. 6C, the data structure 600 illustrates another modification to the corresponding document. For example, additional content is added to the document such that a chunk 642G is added. As illustrated, the chunk 642G includes additional child nodes 637E-H that were added to the list content corresponding to the second list node. As such, the second scalable collection now includes the second list node 633B, the child nodes 637A-H, and three collection aggregators: 652B, 652D, and 652E.

As shown, when the child nodes 637E-G are added to the list node 633B, the data structure 600 rebalances to add the chunk 642G. To accommodate the chunk 642G, the reference chunk 658B is modified to include a radar node 646I. The collection aggregator 652E is also added to the reference chunk 658B. As shown, the radar nodes 646E and 646I, corresponding to the chunks 642E and 642I, are linked to the collection aggregator 652E. The collection aggregator 652E indicates that the radar nodes 646E and 646I are siblings within the first generation level, here generation level zero. In other words, the collection aggregator 652E indicates that the child nodes 637A-D are siblings to the child nodes 637E-H in the first generation level. As can be appreciated, this logically follows as the child nodes 637A-H are children of the second list node 633B in the chunk 642C. By including the collection aggregators 652A-E, the reading protocol can readily traverse between respective chunks when seeking a specific node. Examples of such a case are described in greater detail with respect to FIGS. 7-9.

Figure 6D:
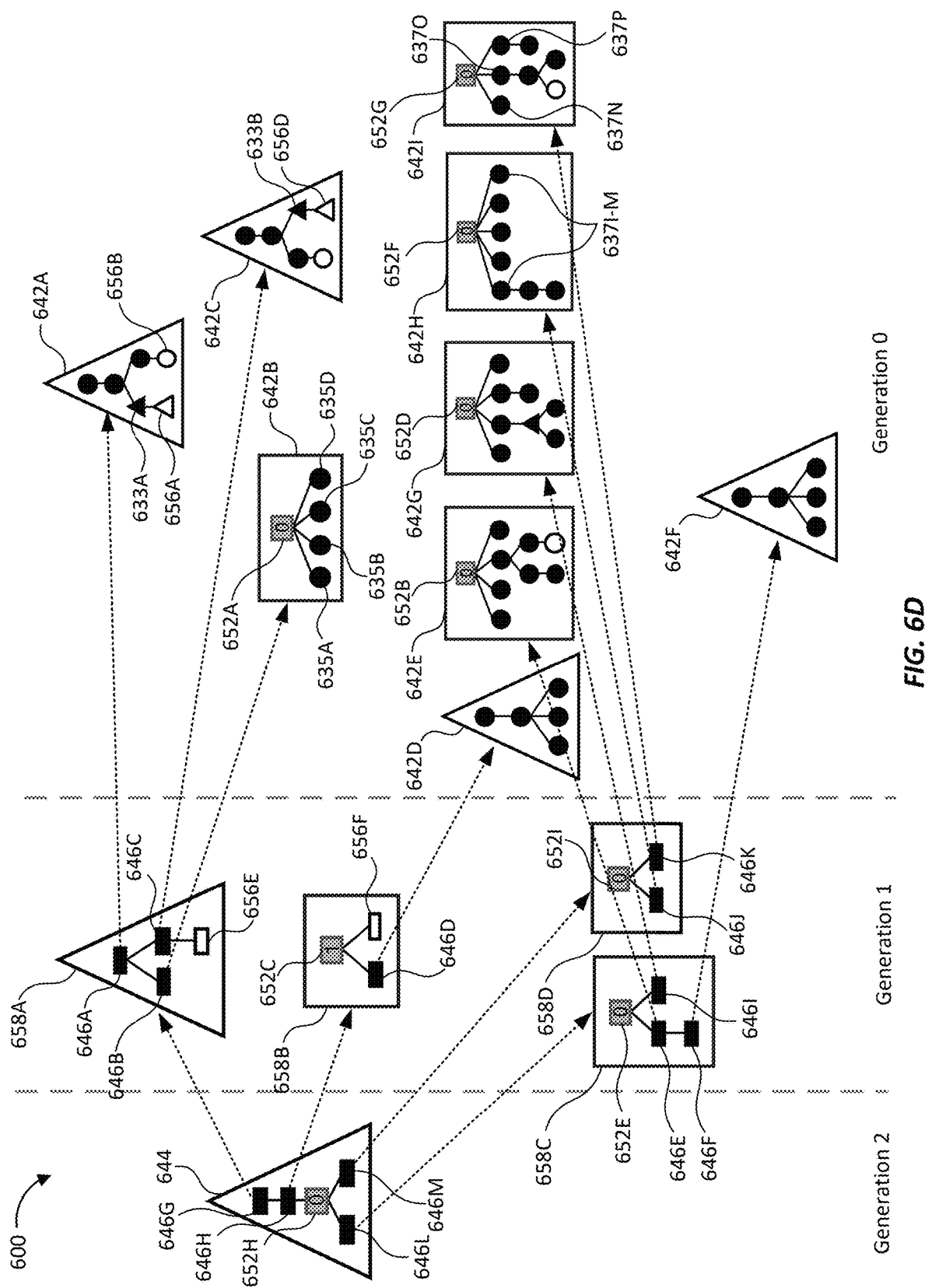

Turning now to FIG. 6D, the data structure 600 illustrates yet another modification to the corresponding document. Specifically, FIG. 6D illustrates that additional list elements are added to list content corresponding to the second list node 633B. As such, additional child nodes 637I-P are added to the data structure 600. To indicate that the child nodes 637I-P are siblings to the child nodes 637A-G within the second scalable collection, the chunk 642H includes a collection aggregator 652F and the chunk 642I includes a collection aggregator 652G. The collection aggregators 652I and 652H may also indicate a relationship between 637I-P and 637A-G.

To accommodate the chunks 642H-I, the data structure 600 is modified to include reference chunks 658C and 658D. As shown, the radar nodes 646E-F and 646I are moved from the reference chunk 658B to the reference chunk 658C, along with the collection aggregator 652E. In their place, the reference chunk 658B now includes the placeholder node 656F. To direct the reading protocol to the reference chunks 658C and 658D, the root chunk 644 includes radar nodes 646L and 646M, which include references to the reference chunks 658C and 658D, respectively. The root chunk 644 also includes a collection aggregator 652H that indicates that the reference chunks 658C and 658D are siblings at the first generation level. As can be appreciated, in application, the data structure 600 may include thousands if not millions of nodes. As such, as the data structure 600 becomes more complex, the collection aggregators as described herein are increasingly vital to directing a reading protocol to an element of interest.

To aid in a reading protocol's efficiency in traversing through the data structure 600, the collection aggregators 652A-G may include additional information about the corresponding elements associated with a given collection aggregator. For example, a collection aggregator may include a sublist summary or a submap summary, each of which is described below in FIGS. 7 and 8, respectively.

Figure 7:
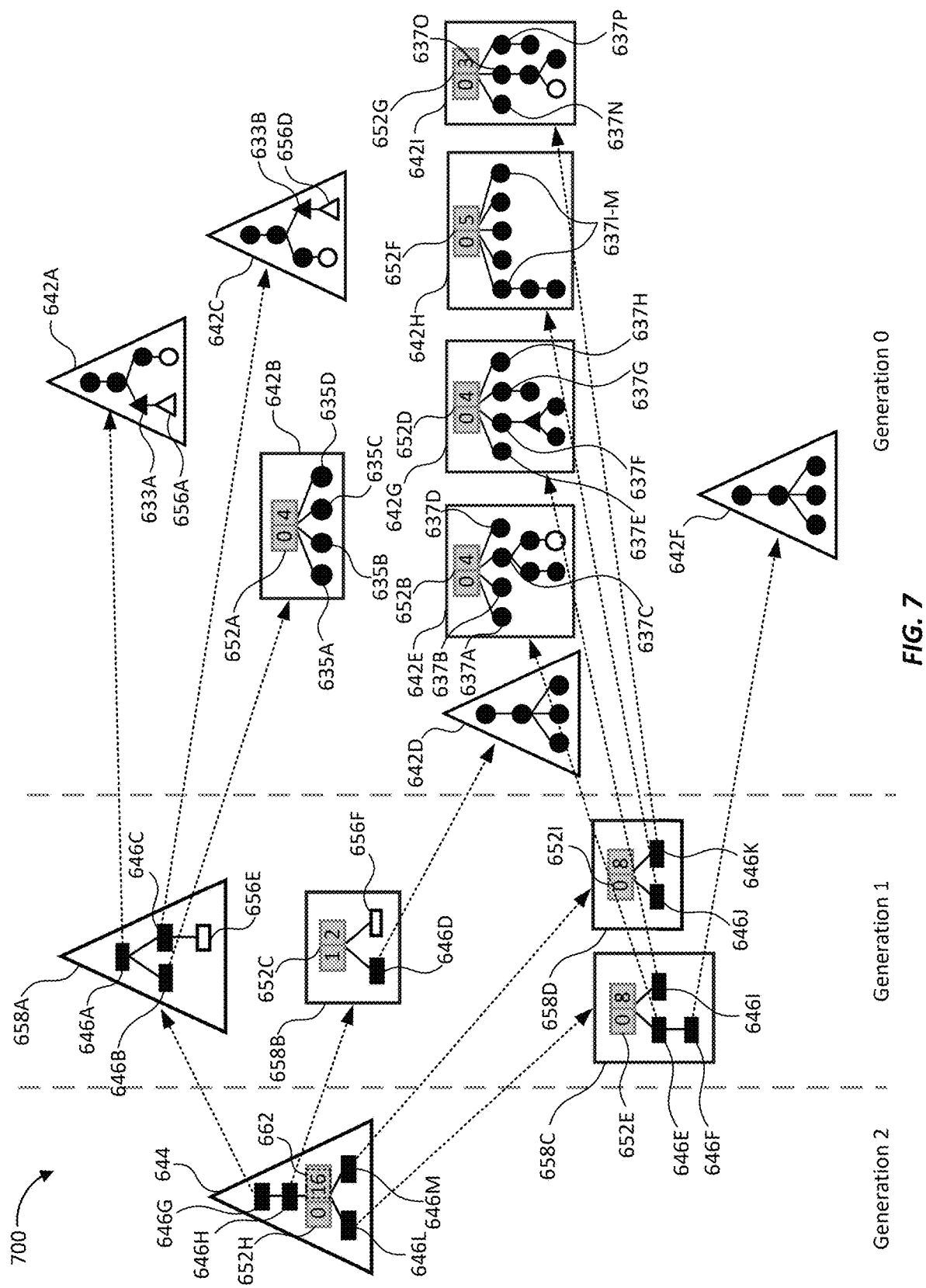
FIG. 7 illustrates an example data structure using collection aggregators containing sublist summaries, according to an embodiment herein.
Figure 8:
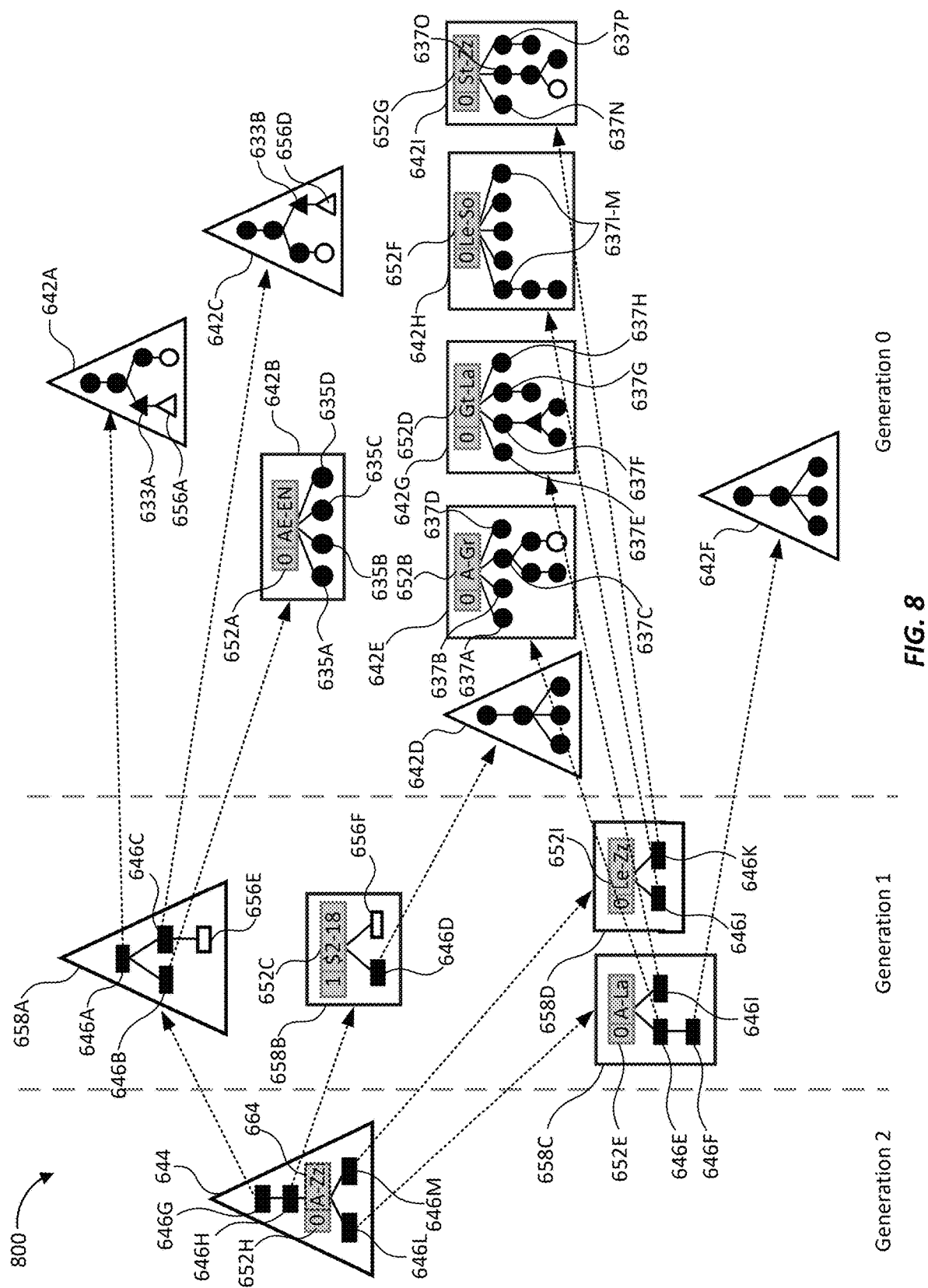
FIG. 8 illustrates an example data structure using collection aggregators containing submap summaries.
Figure 9:
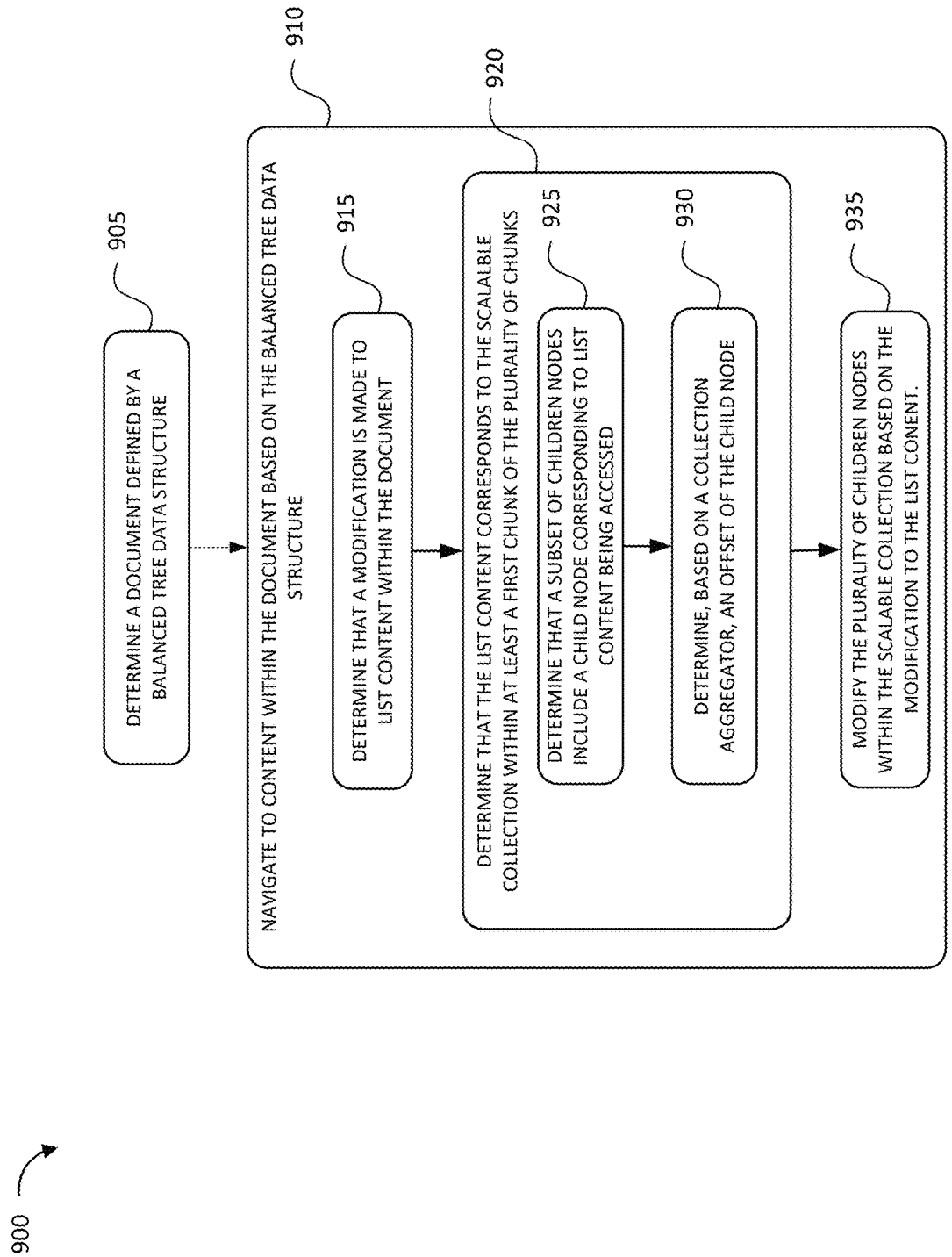
FIG. 9 provides an example flow for using or navigating a data structure using scalable collections, according to an embodiment herein.

For example, FIG. 7 provides an illustrative data structure 700 using collection aggregators containing sublist summaries, according to an embodiment herein, and FIG. 8 provides an illustrative data structure 800 using collection aggregators containing submap summaries, according to an embodiment herein. For ease of illustration, each of the data structures provided in FIGS. 7 and 8 are the same as the data structure 600 illustrated and described in FIG. 6D. Additionally, for illustrative purposes, FIGS. 7 and 8 are described with respect to FIG. 9. Specifically, FIG. 9 provides an example flow 900 for using or navigating a data structure, such as the data structure 700 and 800 provided in FIGS. 7-8, using scalable collections, according to an embodiment herein. As such, the flow 900 is also referred to herein as a scalable collection process.

As shown, to initiate flow 900, a user, such as the user A via the client device 120, may open a document that is defined by a balanced tree data structure, such as the whiteboard 114. As such, the client device 120 may determine that the document is defined by a balanced tree data structure (905). As such, as the user opens and interacts with the content of the document, the client device 120 may navigate the content within the document based on the balanced tree data structure (910).

In an illustrative example, the user A may make a modification to list content within the document, such as the list content 126 (915). With reference to FIG. 7, the user A may make a modification to a list element corresponding to the node 637O. In this example, the reading protocol may first need to determine which node corresponds to the list element being modified. To do so, the reading protocol may determine which list content the list element corresponds to and determine which scalable collection the list content corresponds to (920). That is, as the reading protocol determines that the user A is modifying content within list content corresponding to the second list node 633B, the reading protocol determines that the second list node 633B corresponds to the second scalable collection within the data structure 700. As such, the reading protocol may traverse the data structure 700 using the second scalable collection to the child node 637O.

To traverse from the second list node 633B to the respective child node 637O, the reading protocol may traverse from the second list node 633B to the placeholder node 656D, which directs back to the reference chunk 658A. From the reference chunk 658A, the reading protocol traverses from to the root chunk 644, as described above. At the root chunk 644, the reading protocol traverses from the radar node 646G to the collection aggregator 652H.

As shown, the collection aggregators 652A-H may be or include a sublist summary 662. For ease of illustration, only the sublist summary 662 of the collection aggregator 652H is labeled, however, it should be apparent from the FIG. 7 that each of the collection aggregators 652A-G include a sublist summary. The sublist summary 662 includes a count of a total number of child nodes associated with each collection aggregator. For example, the sublist summary 662 of the collection aggregator 652A is 4, the sublist summary 662 of the collection aggregator 652B is 4, the sublist summary 662 of the collection aggregator 652C is 2, the sublist summary 662 of the collection aggregator 652D is 4, the sublist summary 662 of the collection aggregator 652E is 8, the sublist summary 662 of the collection aggregator 652F is 5, the sublist summary 662 of the collection aggregator 652G is 3, and the sublist summary 662 of the collection aggregator 652H is 16.

By providing a count of the number of child nodes associated with each collection aggregator, the reading protocol can more efficiently identify and traverse to a target node. That is, the sublist summary allows the reading protocol to determine whether a subset of child nodes include a target child node corresponding to the list content being accessed (925). Following the above example, when the reading protocol reaches the collections aggregator 652H, the reading protocol may use the sublist summary 662 to determine if the child node 637O is within the subset of child nodes associated with the radar nodes 646L-M. To do this, the reading protocol may determine that the child node 637O corresponds to a 15$^{th}$ list element within the list content or is the 15$^{th}$ child node within the second list node 633B.

Since the sublist summary 662 indicates that it includes 16 child nodes, and no child nodes within the second scalable collection (e.g., related to the second list node 633B) were encountered by the reading protocol within the chunk 642A and the reference chunk 658A, the reading protocol may compute an offset for the target, child node 637O. For example, the reading protocol may calculate that the 16 child nodes included in the collection aggregator 652H correspond to child nodes 1-16, or child nodes 637A-P. Since the child node 637O is the 15$^{th}$ child within the list node 633B, the reading protocol may calculate that the child node 637O is within the child nodes associated with the collections aggregator 652H.

Since the child node 637O is determined to be within the subset of child nodes associated with the collections aggregator 652H, the reading protocol may traverse to one of the reference chunks 658C and 658D. For example, the reading protocol may traverse to the reference chunk 658C and encounter the collection aggregator 652E. Based on the sublist summary 662 of the collection aggregator 652E, the reading protocol may determine whether the target, child node 637O is within the subset of child nodes associated with the collection aggregator 652E. For example, the sublist summary 662 of the collection aggregator 652E indicates that children 1-8 are associated with the collection aggregator 652E. As children 1-8 correspond to child nodes 637A-H, the reading protocol may determine that the target, child node 637O is not within the child nodes associated with the collection aggregator 652E. As such, the reading protocol may traverse back to the root chunk 644 and traverse to the reference chunk 658D via the radar node 646M.

At the reference chunk 658D, the reading protocol may determine that the target, child node 637O falls within the subset of child nodes associated with the collection aggregator 652I. For example, the collection aggregator 652I includes the sublist summary 662 which indicates that 8 child nodes are associated with the collections aggregator 652I. As the reading protocol already determined that children 1-8 are associated with the collection aggregator 652E, the reading protocol may determine that the 8 children associated with the collection aggregator 652I are children 9-16 or child nodes 637I-P.

Since the reading protocol knows that the target, child node 637O is the 15$^{th}$ child, the reading protocol can calculate an offset to reach the target, child node 637O (930). To calculate the offset, the reading protocol may determine how many children are in each of the corresponding chunks 642H-I to determine which chunk contains the child node 637O. For example, the reading protocol may first traverse, via the radar node 646J, to the chunk 642H. At the chunk 642H, the reading protocol may read the collection aggregator 652F containing the sublist summary 662 that indicates that 5 children are in the chunk 642H. Based on the sublist summary 662 indicating that 5 children are in the chunk 642H, the reading protocol determines that the chunk 642H includes the child nodes 637I-M and that the target, child node 637O is not in the chunk 642H.

As such, the reading protocol traverses back to the radar node 658D and to the chunk 642I, where based on the collections aggregator 652I including the sublist summary 662 indicating three children, determine that the child node 637O is the second child node within the chunk 642I. Once the child node 637O is accessed, the reading protocol may modify the child node 637O based on the modification made by the corresponding user (935). As described above, this may include adding more nodes, removing nodes, or modifying the data associated with the target, child node.

As illustrated above, instead of having to load each node within the chunks to determine or access the target, child node 637O, the sublist summaries allow the reading protocol to compute whether a target, child node is within a specific subset of child nodes. In some cases, the sublist summary allows the reading protocol to calculate an offset of the target, child node and efficiently access the target, child node based on the offset without having to access and read each intermediate node. O Referring now to FIG. 8, in some cases, a collection aggregator may include a submap summary 664. In some embodiments, the collection aggregator includes the submap summary 664 in addition to the sublist summary 662, while in other embodiments, the collection aggregator includes the submap summary 664 instead of the sublist summary 662. As illustrated, each of the collection aggregators 652A-H may include a respective submap summary 664. Similar to above, for ease of illustration, only the submap summary 664 of the collection aggregator 652H is labeled, however, it should be apparent from the FIG. 8 that each of the collection aggregators 652A-G include a submap summary.

The submap summary 664 includes a value range or a key-value range of the child nodes associated with each collection aggregator. The value range may include a value corresponding to the first child node and a value corresponding to the last child node within the child nodes associated with the respective collection aggregator. The value may be or include the list element corresponding to a respective child node. In some cases, the value may be an abbreviation or representation of the list element corresponding to a respective child node. For example, the submap summary 664 of the collection aggregator 652A includes the range AE-EN (e.g., country codes), the submap summary 664 of the collection aggregator 652B includes the range A-Gr, the submap summary 664 of the collection aggregator 652C includes the range $2-18, the submap summary 664 of the collection aggregator 652D includes the range Gt-La, the submap summary 664 of the collection aggregator 652E includes the range A-La, the submap summary 664 of the collection aggregator 652F includes the range Le-So, the submap summary 664 of the collection aggregator 652G includes the range St-Zz, and the submap summary 664 of the collection aggregator 652H includes the range A-Zz.

In this example, the second scalable collection including the list node 633B may correspond to list content having a range of names. As such, each of the submap summaries 664 may indicate which subset of names are included in the child nodes associated with each respective collection aggregator. For example, the submap summary 664 of the collection aggregator 652D indicates that child nodes 637E-H corresponding to names Gterra and Lawson are included in the chunk 642G.

Similar to how the reading protocol used the sublist summary 662 to determine whether a target, child node is included in a subset of child nodes associated with a respective collection aggregator, the reading protocol may similarly use the submap summary 664. For example, if the reading protocol, based on a user accessing or modifying a list element including the name Lee, is traversing from the second list node 633B to the child node 637I, the reading protocol may use the submap summaries 664 to determine which subset of child nodes (e.g., chunk), the target, child node 637I is in. As such, at the collections aggregator 652H, the reading protocol determines that the child node 637I corresponding to the name Lee is included in the associated child nodes based on the submap summary having the range A-Zz (Lee falls within the range A-Zz). From there, the reading protocol traverses to the reference chunk 658C and based on the collection aggregator 652E and its respective submap summary 664 and determines that the target, child node 637I is not in the subset of child nodes associated with the collection aggregator 652E (e.g., the range A-La does not include Lee).

From there, the reading protocol traverses over to the radar node 658D and determines that the target, child node 637I is in the subset of child nodes associated with the collection aggregator 652I based on the submap summary 664 (Lee is within the range Le-Zz). From there the reading protocol traverses to the chunk 642H and determines that the target, child node 637I is in the child nodes associated with the collection aggregator 652F based on the submap summary 664. The reading protocol also determines, based on the range of the submap summary 664 that the target, child node 637I is the first child node within the chunk 645H.

Referring still to FIG. 10, FIG. 10 illustrates a computing system 1001 that be used for providing one or more scalable collections, as described herein. For example, the client device 120 or 130 may be or include the computing system 1001. As illustrated, the computing system 1001 includes a processing system 1002 that includes a microprocessor and other circuitry that retrieves and executes software 1005 from storage system 1003. The processing system 1002 may be implemented within a single processing device but may also be distributed across multiple processing devices or sub-systems that cooperate in executing program instructions. Examples of the processing system 1002 include general purpose central processing units, graphical processing units, application specific processors, and logic devices, as well as any other type of processing device, combinations, or variations thereof.

The storage system 1003 may comprise any computer readable storage media readable by processing system 1002 and capable of storing software 1005. The storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 1003 may also include computer readable communication media over which at least some of the software 1005 may be communicated internally or externally. The storage system 1003 may be implemented as a single storage device but may also be implemented across multiple storage devices or sub-systems co-located or distributed relative to each other. The storage system 1003 may comprise additional elements, such as a controller capable of communicating with the processing system 1002 or possibly other systems.

The software 1005 (including a scalable collections process 1006) may be implemented in program instructions and among other functions may, when executed by the processing system 1002, direct the processing system 1002 to operate as described with respect to the various operational scenarios, sequences, and processes illustrated herein. For example, the software 1005 may include program instructions for implementing a Scalable collections as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 1005 may include additional processes, programs, or components, such as operating system software, virtualization software, or other application software. The software 1005 may also comprise firmware or some other form of machine-readable processing instructions executable by the processing system 1002.

In general, the software 1005 may, when loaded into the processing system 1002 and executed, transform a suitable apparatus, system, or device (of which computing system 1001 is representative) overall from a general-purpose computing system into a special-purpose computing system customized to support insights features, functionality, and user experiences. Indeed, encoding the software 1005 on the storage system 1003 may transform the physical structure of the storage system 1003. The specific transformation of the physical structure may depend on various factors in different implementations of this description. Examples of such factors may include, but are not limited to, the technology used to implement the storage media of the storage system 1003 and whether the computer-storage media are characterized as primary or secondary storage, as well as other factors.

For example, if the computer readable storage media are implemented as semiconductor-based memory, the software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DATA STRUCTUREP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computerized method for using a scalable collection within a balanced tree data structure, the computerized method comprising: determining a document defined by a balanced tree data structure, the balanced tree data structure comprising: a root chunk; a plurality of reference chunks; and a plurality of chunks, wherein: each chunk comprises one or more nodes each corresponding to a document attribute, wherein the one or more nodes comprise: a scalable collection, wherein the scalable collection comprises a list node and a plurality of child nodes associated with the list node; and a placeholder node that provides a reference to another chunk within the plurality of chunks based on a position of the placeholder node within a respective chunk; and the root chunk, the plurality of reference chunks, and the plurality of chunks are arranged in a hierarchical arrangement with the root chunk being a parent to one or more reference chunks within the plurality of reference chunks, the one or more reference chunks being a parent to one or more chunks within the plurality of chunks, and each level of the hierarchical arrangement defining a generation level; and navigating to content within the document based on the balanced tree data structure.

Example 2 is the computerized method of any previous or subsequent Example, wherein navigating to content within the document based on the balanced tree data structure comprises: determining that a modification is made to list content within the document; determining that the list content corresponds to the scalable collection within at least a first chunk of the plurality of chunks; and modifying the plurality of child nodes within the scalable collection based on the modification to the list content, wherein the child nodes are siblings to each other within a first generation level.

Example 3 is the computerized method of any previous or subsequent Example, wherein modifying the plurality of child nodes within the scalable collection based on the modification to the list content comprises: adding one or more child nodes corresponding to the list content to the plurality of children within the scalable collection; determining an encoding size for the one or more nodes within the first chunk; determining that the encoding size for the one or more nodes within the first chunk is above an encoding threshold; and adding a new chunk to the plurality of chunks, wherein the plurality of child nodes is rearranged between the first chunk and the new chunk.

Example 4 is the computerized method of any previous or subsequent Example, wherein modifying the plurality of child nodes within the scalable collection based on the modification to the list content comprises: removing a subset of child nodes corresponding to the list content from the plurality of children within the scalable collection; determining an encoding size for the one or more nodes within the at least first chunk; determining that the encoding size for the one or more nodes within the least first chunk is below an encoding threshold; and removing a second chunk from the plurality of chunks, wherein one or more child nodes of the plurality of child nodes from the second chunk is rearranged to the first chunk.

Example 5 is the computerized method of any previous or subsequent Example, wherein the scalable collection comprises a collection aggregator indicating that the plurality of child nodes corresponding to the list node are siblings at a first generation level.

Example 6 is the computerized method of any previous or subsequent Example, wherein the scalable collection comprises a sublist summary providing a count of a subset of the plurality of child nodes within a given chunk.

Example 7 is the computerized method of any previous or subsequent Example, wherein the scalable collection comprises a submap summary providing a range of a subset of the plurality of child nodes within a given chunk, wherein the range comprises a first value corresponding a first child node within the subset and a second value of a last child node within the subset.

Example 8 is the computerized method of any previous or subsequent Example, wherein: the plurality of child nodes within the scalable collection comprises a first subset of child nodes and a second subset of child nodes; the plurality of chunks comprises a first chunk containing the first subset of child nodes and a second chunk containing the second subset of child nodes; the scalable collection comprises a collection aggregator indicating that the first subset of child nodes and the second subset of child nodes are siblings at a first generation level; and navigating to content within the document based on the balanced tree data structure further comprises: determining that the second subset of child nodes comprises a first child node corresponding to list content being accessed; determining, based on the collections aggregator, an offset of the first child node within the second subset of child nodes; and traversing to the first child node within the second chunk based on the offset.

Example 9 is the computerized method of any previous or subsequent Example, wherein the collections aggregator comprises a first sublist summary and a second sublist summary, wherein: the first sublist summary comprises a count of the first subset of the plurality of child nodes within the first chunk; the second sublist summary comprises a count of the second subset of the plurality of child nodes within the second chunk; and determining, based on the collections aggregator, the offset of the first child node within the second subset of child nodes comprises determining the offset of the first child node based on the first sublist summary and the second sublist summary.

Example 10 is the computerized method of any previous or subsequent Example, wherein the collections aggregator comprises a first submap summary and a second submap summary, wherein: the first submap summary comprises a key-value range of the first subset of the plurality of child nodes within the first chunk; the second submap summary comprises a key-value range of the second subset of the plurality of child nodes within the second chunk; and determining, based on the collections aggregator, the offset of the first child node within the second subset of child nodes comprises determining the offset of the first child node based on the first submap summary and the second submap summary.

Example 11 is a non-transitory computer-readable medium comprising processor-executable instructions configured to cause one or more processors to: receive, from a client device, an indication to access a document defined by a balanced tree data structure, the balanced tree data structure comprising: a root chunk; a plurality of reference chunks; and a plurality of chunks, wherein: each chunk comprises one or more nodes each corresponding to a document attribute, wherein the one or more nodes comprise: a scalable collection, wherein the scalable collection comprises a list node and a plurality of child nodes associated with the list node; and a placeholder node that provides a reference to another chunk within the plurality of chunks based on a position of the placeholder node within a respective chunk; and the root chunk, the plurality of reference chunks, and the plurality of chunks are arranged in a hierarchical arrangement with the root chunk being a parent to one or more reference chunks within the plurality of reference chunks, the one or more reference chunks being a parent to one or more chunks within the plurality of chunks, and each level of the hierarchical arrangement defining a generation level; and navigate, responsive to input from the client device, to content within the document based on the balanced tree data structure.

Example 12 is the non-transitory computer-readable medium of any previous or subsequent Example, wherein the processor-executable instructions to navigate, responsive to input from the client device, to content within the document based on the balanced tree data structure cause the one or more processors to further execute processor-executable instructions stored in the non-transitory computer-readable medium to: determine, responsive to input from the client device, that list content is added to the document; determine that the list content corresponds to the scalable collection within a first chunk of the plurality of chunks; add one or more child nodes corresponding to the list content to the plurality of child nodes within the scalable collection, wherein the plurality of child nodes are siblings to each other within a first generation level; determine an encoding size for the one or more nodes within a first chunk; determine that the encoding size for the one or more nodes within the first chunk is above an encoding threshold; generate a new chunk within the plurality of chunks of the balanced tree data structure; arrange the plurality of child nodes between the first chunk and the new chunk such that the first chunk comprises a first subset of child nodes and the new chunk comprises a second subset of the child nodes; and add a list placeholder node to the first chunk, wherein the list placeholder node comprises a reference pointing to the new chunk.

Example 13 is the non-transitory computer-readable medium of any previous or subsequent Example, wherein the processor-executable instructions to generate the new chunk within the plurality of chunks of the balanced tree data structure cause the one or more processors to further execute processor-executable instructions stored in the non-transitory computer-readable medium to: generate a collection aggregator for the new chunk, wherein the collection aggregator indicates that the first subset of child nodes and the second subset of child nodes are siblings at the first generation level.

Example 14 is the non-transitory computer-readable medium of any previous or subsequent Example, wherein the processor-executable instructions cause the one or more processors to further execute processor-executable instructions stored in the non-transitory computer-readable medium to: determine, responsive to input from the client device, that list content is removed from the document; determine that the list content corresponds to a first subset of child nodes of the plurality of child nodes within a first chunk of the plurality of chunks; remove the first subset of child nodes corresponding to the list content from the plurality of child nodes within the scalable collection; determine an encoding size for the one or more nodes within the first chunk after the first subset of child nodes are removed; determine that the encoding size for the one or more nodes within the first chunk is below an encoding floor threshold; rebalance the one or more nodes within the plurality of chunks, wherein rebalancing the one or more nodes within the plurality of chunks comprises: removing the first chunk from the plurality of chunks; and rearranging the plurality of child nodes into one or more other chunks within the plurality of chunks based on the encoding size of the one or more nodes from the first chunk.

Example 15 is the non-transitory computer-readable medium of any previous or subsequent Example, wherein: the processor-executable instructions cause the one or more processors to further execute processor-executable instructions stored in the non-transitory computer-readable medium to receive, from the client device, an indication to access a list element within the document; and the processor-executable instructions to navigate to content within the document based on the balanced tree data structure cause the one or more processors to further execute processor-executable instructions stored in the non-transitory computer-readable medium: identify a first node of the one or more nodes associated with current content within the document, wherein the first node is in a first chunk of the plurality of chunks; traverse, starting with the first node, the one or more nodes within the balanced tree data structure until a collection aggregator is encountered, wherein the scalable collection comprises the collection aggregator; and determine, based on the collection aggregator, an object node corresponding to the list element.

Example 16 is the non-transitory computer-readable medium of any previous or subsequent Example, wherein: the plurality of child nodes within the scalable collection comprises a first subset of child nodes and a second subset of child nodes; the scalable collection comprises a collection aggregator indicating that the first subset of child nodes and the second subset of child nodes are siblings at a first generation level; the plurality of chunks comprise a first chunk comprising the first subset of child nodes and a second chunk comprising the second subset of child nodes; and the processor-executable instructions to navigate to content within the document based on the balanced tree data structure cause the one or more processors to further execute processor-executable instructions stored in the non-transitory computer-readable medium: determine that the second subset of child nodes comprises a first child node to be accessed; determine, based on the collections aggregator, an offset of the first child node within the second subset of child nodes; and traverse to the first child node within the second chunk based on the offset.

Example 17 is the non-transitory computer-readable medium of any previous or subsequent Example, wherein the scalable collection comprises a collection aggregator and the processor-executable instructions cause the one or more processors to further execute processor-executable instructions stored in the non-transitory computer-readable medium to: determine a modification to list content comprising a plurality of list elements within the document, wherein each of the plurality of child nodes within the scalable collection corresponds to a respective list element of the plurality of list elements; and rebalance the plurality of child nodes between one or more chunks of the plurality of chunks based on the modification to the list content; and update the collection aggregator based on rebalancing the plurality of child nodes between the one or more chunks.

Example 18 is a computerized method for using a scalable collection within a balanced tree data structure, the computerized method comprising: creating and storing data into a plurality of nodes within a data structure, wherein the data structure comprises: a root chunk; and a plurality of chunks, wherein: each chunk comprises one or more nodes each corresponding to a document attribute, wherein the one or more nodes comprise a placeholder node that provides a reference to another chunk within the plurality of chunks based on a position of the placeholder node within a respective chunk; and the root chunk and the plurality of chunks are arranged in a hierarchical arrangement comprising a plurality of generation levels with the root chunk being at a greater generation level than the plurality of chunks; and chunking the data into the plurality of chunks, wherein chunking the data comprises at least: determining list content comprising a plurality of list elements; generating a scalable collection comprising a list node and a plurality of child nodes associated with the list node, wherein each of the plurality of children corresponds to a respective list elements of the plurality of list elements and the one or more nodes comprise the scalable collection; arranging child nodes corresponding to the plurality of list elements into one or more chunks of the plurality of chunks based on an encoding size of each of the plurality of list elements; and generating at least one collection aggregator for the scalable collection, wherein the at least one collection aggregator indicates that the plurality of child nodes are siblings at a first generation level.

Example 19 is the computerized method of any previous or subsequent Example, wherein the at least one collection aggregator comprises a sublist summary, and the method further comprises: determining a modification to the plurality of list elements; and updating the sublist summary based on the modification to the plurality of list elements, wherein the sublist summary provides a count of a subset of the plurality of child nodes within a given chunk.

Example 20 is the computerized method of any previous or subsequent Example, wherein the at least one collection aggregator comprises a submap summary, and the method further comprises: determining a modification to the plurality of list elements; and updating the submap summary based on the modification to the plurality of list elements, wherein: the submap summary provides a range of a subset of the plurality of child nodes within a given chunk; and the range comprises a first value corresponding a first child node within the subset and a second value of a last child node within the subset.

What is claimed is:

1. A computerized method for using a scalable collection within a balanced tree data structure, the computerized method comprising:
   determining, by one or more processors, a document defined by a balanced tree data structure for logarithmic access and memory-efficient rebalancing, the balanced tree data structure comprising:
   a root chunk;
   a plurality of reference chunks; and
   a plurality of chunks, wherein:
      each chunk comprises one or more nodes each corresponding to a document attribute, wherein the one or more nodes comprise:
      the scalable collection comprising:
         a list node;
         a plurality of child nodes associated with the list node; and
         a collection aggregator comprising one or more sublist or submap summaries usable to compute an offset of a target node using a logarithmic function of a number of child nodes within the plurality of child nodes; and
         a placeholder node that provides a reference to another chunk within the plurality of chunks based on a position of the placeholder node within a respective chunk; and
      the root chunk, the plurality of reference chunks, and the plurality of chunks are arranged in a hierarchical arrangement with the root chunk being a parent to one or more reference chunks within the plurality of reference chunks, the one or more reference chunks being a parent to one or more chunks within the plurality of chunks, and each level of the hierarchical arrangement defining a generation level; and
   navigating to content within the document by determining an offset to a target child node using the collection aggregator and accessing only a subset of the chunks based on the determined offset.

2. The computerized method of claim 1, wherein navigating to content within the document based on the balanced tree data structure comprises:
   determining that a modification is made to list content within the document;
   determining that the list content corresponds to the scalable collection within at least a first chunk of the plurality of chunks; and
   modifying the plurality of child nodes within the scalable collection based on the modification to the list content, wherein the child nodes are siblings to each other within a first generation level.

3. The computerized method of claim 2, wherein modifying the plurality of child nodes within the scalable collection based on the modification to the list content comprises:
   adding one or more child nodes corresponding to the list content to the plurality of children within the scalable collection;
   determining an encoding size for the one or more nodes within the first chunk;
   determining that the encoding size for the one or more nodes within the first chunk is above an encoding threshold; and
   adding a new chunk to the plurality of chunks, wherein the plurality of child nodes is rearranged between the first chunk and the new chunk.

4. The computerized method of claim 2, wherein modifying the plurality of child nodes within the scalable collection based on the modification to the list content comprises:
   removing a subset of child nodes corresponding to the list content from the plurality of children within the scalable collection;

determining an encoding size for the one or more nodes within the at least first chunk;

determining that the encoding size for the one or more nodes within the least first chunk is below an encoding threshold; and removing a second chunk from the plurality of chunks, wherein one or more child nodes of the plurality of child nodes from the second chunk is rearranged to the first chunk.

5. The computerized method of claim 1, wherein the collection aggregator indicates that the plurality of child nodes corresponding to the list node are siblings at a first generation level.

6. The computerized method of claim 1, wherein the one or more sublist summaries comprise a first sublist summary providing a count of a subset of the plurality of child nodes within a given chunk.

7. The computerized method of claim 1, wherein the one or more submap summaries comprise a first submap summary providing a range of a subset of the plurality of child nodes within a given chunk, wherein the range comprises a first value corresponding a first child node within the subset and a second value of a last child node within the subset.

8. The computerized method of claim 1, wherein:

the plurality of child nodes within the scalable collection comprises a first subset of child nodes and a second subset of child nodes;

the plurality of chunks comprises a first chunk containing the first subset of child nodes and a second chunk containing the second subset of child nodes;

the collection aggregator indicates that the first subset of child nodes and the second subset of child nodes are siblings at a first generation level; and navigating to content within the document based on the balanced tree data structure further comprises:

determining that the second subset of child nodes comprises a first child node corresponding to list content being accessed;

determining, based on the collections aggregator, an offset of the first child node within the second subset of child nodes; and traversing to the first child node within the second chunk based on the offset.

9. The computerized method of claim 8, wherein the one or more sublist or submap summaries comprise a first sublist summary and a second sublist summary, wherein:

the first sublist summary comprises a count of the first subset of the plurality of child nodes within the first chunk;

the second sublist summary comprises a count of the second subset of the plurality of child nodes within the second chunk; and determining, based on the collections aggregator, the offset of the first child node within the second subset of child nodes comprises determining the offset of the first child node based on the first sublist summary and the second sublist summary.

10. The computerized method of claim 8, wherein the one or more sublist or submap summaries comprise a first submap summary and a second submap summary, wherein:

the first submap summary comprises a key-value range of the first subset of the plurality of child nodes within the first chunk;

the second submap summary comprises a key-value range of the second subset of the plurality of child nodes within the second chunk; and determining, based on the collections aggregator, the offset of the first child node within the second subset of child nodes comprises determining the offset of the first child node based on the first submap summary and the second submap summary.

11. A non-transitory computer-readable medium comprising processor-executable instructions configured to cause one or more processors to:

receive, from a client device, an indication to access a document defined by a balanced tree data structure for logarithmic access and memory-efficient rebalancing, the balanced tree data structure comprising:

a root chunk;

a plurality of reference chunks; and a plurality of chunks, wherein:

each chunk comprises one or more nodes each corresponding to a document attribute, wherein the one or more nodes comprise:

a scalable collection, wherein the scalable collection comprises a list node and a plurality of child nodes associated with the list node;

a collections aggregator comprising one or more sublist or submap summaries usable to compute an offset of a target node using a logarithmic function of a number of child nodes within the plurality of child nodes; and a placeholder node that provides a reference to another chunk within the plurality of chunks based on a position of the placeholder node within a respective chunk; and the root chunk, the plurality of reference chunks, and the plurality of chunks are arranged in a hierarchical arrangement with the root chunk being a parent to one or more reference chunks within the plurality of reference chunks, the one or more reference chunks being a parent to one or more chunks within the plurality of chunks, and each level of the hierarchical arrangement defining a generation level; and navigate, responsive to input from the client device, to content within the document by determining an offset to a target child node using the collections aggregator and accessing only a subset of chunks based on the determined offset.

12. The non-transitory computer-readable medium of claim 11, wherein the processor-executable instructions to navigate, responsive to input from the client device, to content within the document based on the balanced tree data structure cause the one or more processors to further execute processor-executable instructions stored in the non-transitory computer-readable medium to:

determine, responsive to input from the client device, that list content is added to the document;

determine that the list content corresponds to the scalable collection within a first chunk of the plurality of chunks;

add one or more child nodes corresponding to the list content to the plurality of child nodes within the scalable collection, wherein the plurality of child nodes are siblings to each other within a first generation level;

determine an encoding size for the one or more nodes within a first chunk;

determine that the encoding size for the one or more nodes within the first chunk is above an encoding threshold;

generate a new chunk within the plurality of chunks of the balanced tree data structure;

arrange the plurality of child nodes between the first chunk and the new chunk such that the first chunk comprises a first subset of child nodes and the new chunk comprises a second subset of the child nodes; and add a list placeholder node to the first chunk, wherein the list placeholder node comprises a reference pointing to the new chunk.

13. The non-transitory computer-readable medium of claim 12, wherein the processor-executable instructions to generate the new chunk within the plurality of chunks of the balanced tree data structure cause the one or more processors to further execute processor-executable instructions stored in the non-transitory computer-readable medium to:

generate a second collection aggregator for the new chunk, wherein the second collection aggregator indicates that the first subset of child nodes and the second subset of child nodes are siblings at the first generation level.

14. The non-transitory computer-readable medium of claim 11, wherein the processor-executable instructions cause the one or more processors to further execute processor-executable instructions stored in the non-transitory computer-readable medium to:

determine, responsive to input from the client device, that list content is removed from the document;

determine that the list content corresponds to a first subset of child nodes of the plurality of child nodes within a first chunk of the plurality of chunks;

remove the first subset of child nodes corresponding to the list content from the plurality of child nodes within the scalable collection;

determine an encoding size for the one or more nodes within the first chunk after the first subset of child nodes are removed;

determine that the encoding size for the one or more nodes within the first chunk is below an encoding floor threshold;

rebalance the one or more nodes within the plurality of chunks, wherein rebalancing the one or more nodes within the plurality of chunks comprises:

removing the first chunk from the plurality of chunks; and rearranging the plurality of child nodes into one or more other chunks within the plurality of chunks based on the encoding size of the one or more nodes from the first chunk.

15. The non-transitory computer-readable medium of claim 11, wherein:

the processor-executable instructions cause the one or more processors to further execute processor-executable instructions stored in the non-transitory computer-readable medium to receive, from the client device, an indication to access a list element within the document; and the processor-executable instructions to navigate to content within the document based on the balanced tree data structure cause the one or more processors to further execute processor-executable instructions stored in the non-transitory computer-readable medium:

identify a first node of the one or more nodes associated with current content within the document, wherein the first node is in a first chunk of the plurality of chunks;

traverse, starting with the first node, the one or more nodes within the balanced tree data structure until the collection aggregator is encountered; and determine, based on the collection aggregator, an object node corresponding to the list element.

16. The non-transitory computer-readable medium of claim 11, wherein:

the plurality of child nodes within the scalable collection comprises a first subset of child nodes and a second subset of child nodes;

the collection aggregator indicates that the first subset of child nodes and the second subset of child nodes are siblings at a first generation level;

the plurality of chunks comprise a first chunk comprising the first subset of child nodes and a second chunk comprising the second subset of child nodes; and the processor-executable instructions to navigate to content within the document based on the balanced tree data structure cause the one or more processors to further execute processor-executable instructions stored in the non-transitory computer-readable medium:

determine that the second subset of child nodes comprises a first child node to be accessed;

determine, based on the collections aggregator, an offset of the first child node within the second subset of child nodes; and traverse to the first child node within the second chunk based on the offset.

17. The non-transitory computer-readable medium of claim 11, wherein the processor-executable instructions cause the one or more processors to further execute processor-executable instructions stored in the non-transitory computer-readable medium to:

determine a modification to list content comprising a plurality of list elements within the document, wherein each of the plurality of child nodes within the scalable collection corresponds to a respective list element of the plurality of list elements; and rebalance the plurality of child nodes between one or more chunks of the plurality of chunks based on the modification to the list content; and update the collection aggregator based on rebalancing the plurality of child nodes between the one or more chunks.

18. A computerized method for using a scalable collection within a balanced tree data structure, wherein the balanced tree data structure supports logarithmic access and memory-efficient rebalancing, the computerized method comprising:

creating and storing data into a plurality of nodes within a data structure, wherein the data structure comprises:

a root chunk; and a plurality of chunks, wherein:

each chunk comprises one or more nodes each corresponding to a document attribute, wherein the one or more nodes comprise a placeholder node that provides a reference to another chunk within the plurality of chunks based on a position of the placeholder node within a respective chunk; and the root chunk and the plurality of chunks are arranged in a hierarchical arrangement comprising a plurality of generation levels with the root chunk being at a greater generation level than the plurality of chunks; and chunking the data into the plurality of chunks, wherein chunking the data comprises at least:

determining list content comprising a plurality of list elements;

generating a scalable collection comprising a list node and a plurality of child nodes associated with the list node, wherein each of the plurality of children corresponds to a respective list elements of the plurality of list elements and the one or more nodes comprise the scalable collection;

arranging the plurality of child nodes corresponding to the plurality of list elements into one or more chunks of the plurality of chunks based on an encoding size of each of the plurality of list elements; and generating at least one collection aggregator for the scalable collection, wherein the at least one collection aggregator:

indicates that the plurality of child nodes are siblings at a first generation level; and comprises one or more sublist or submap summaries usable to compute an offset of a target node using a logarithmic function of a number of child nodes within the plurality of child nodes for navigating to content within a document.

19. The computerized method of claim 18, wherein the one or more sublist or submap summaries comprise a first sublist summary, and the method further comprises:

determining a modification to the plurality of list elements; and updating the first sublist summary based on the modification to the plurality of list elements, wherein the first sublist summary provides a count of a subset of the plurality of child nodes within a given chunk.

20. The computerized method of claim 18, wherein the one or more sublist or submap summaries comprise a first submap summary, and the method further comprises:

determining a modification to the plurality of list elements; and updating the first submap summary based on the modification to the plurality of list elements, wherein:

the first submap summary provides a range of a subset of the plurality of child nodes within a given chunk; and the range comprises a first value corresponding a first child node within the subset and a second value of a last child node within the subset.

* * * * *